*(12)* United States Patent
Ossig et al.

*(10)* Patent No.: US 12,321,500 B2
*(45)* Date of Patent: *Jun. 3, 2025

*(54)* TRACKING DATA ACQUIRED BY COORDINATE MEASUREMENT DEVICES THROUGH A WORKFLOW

*(71)* Applicant: FARO Technologies, Inc., Lake Mary, FL (US)

*(72)* Inventors: Martin Ossig, Tamm (DE); Oswin Horvath, Tamm (DE); Daniel Flohr, Stuttgart (DE)

*(73)* Assignee: FARO Technologies, Inc., Lake Mary, FL (US)

*( * )* Notice: Subject to any disclaimer, the term of this patent is extended or adjusted under 35 U.S.C. 154(b) by 9 days.

This patent is subject to a terminal disclaimer.

*(21)* Appl. No.: 18/362,477

*(22)* Filed: Jul. 31, 2023

*(65)* Prior Publication Data

US 2023/0376636 A1 Nov. 23, 2023

Related U.S. Application Data

*(63)* Continuation of application No. 17/687,791, filed on Mar. 7, 2022, now Pat. No. 11,755,784, which is a
(Continued)

*(51)* Int. Cl.
*H04L 9/40* (2022.01)
*G06F 21/60* (2013.01)
(Continued)

*(52)* U.S. Cl.
CPC ............ *G06F 21/64* (2013.01); *G06F 21/606* (2013.01); *G06Q 10/0838* (2013.01); *H04L 9/3247* (2013.01); *H04L 9/50* (2022.05)

*(58)* Field of Classification Search
CPC ... G06F 21/64; G06F 21/606; G06Q 10/0838; H04L 9/3247; H04L 9/50
See application file for complete search history.

*(56)* References Cited

U.S. PATENT DOCUMENTS 6,182,185 B1 1/2001 Stokes
8,705,012 B2 4/2014 Greiner et al.
(Continued)

OTHER PUBLICATIONS

Bonomi et al., Blockchain-based Chain of Custody for Evidences Management in Digital Forensics. Cornell University Library. 18 pages, Jul. 26, 2018.
(Continued)

*Primary Examiner* — Ghodrat Jamshidi
*(74) Attorney, Agent, or Firm* — McCarter & English, LLP

*(57)* ABSTRACT

A method that includes providing a database for storing meta-data that describes steps in a workflow and an order of the steps in the workflow. The meta-data includes, for each of the steps: a reference to an input data file for the step; a description of a transaction performed at the step; and a reference to an output data file generated by the step based at least in part on applying the transaction to the input data file. Data that includes meta-data for a step in the workflow is received and the data is stored in the database. A trace of the workflow is generated based at least in part on contents of the database. The generating is based on receiving a request from a requestor for the trace of the workflow. At least a subset of the trace is output to the requestor.

22 Claims, 14 Drawing Sheets

Related U.S. Application Data continuation of application No. 16/520,585, filed on Jul. 24, 2019, now Pat. No. 11,321,491.

(51) Int. Cl.
  *G06F 21/64* (2013.01)
  *G06Q 10/083* (2023.01)
  *H04L 9/32* (2006.01)
  *H04L 9/00* (2022.01)

(56) References Cited

U.S. PATENT DOCUMENTS

| | | | |
|---|---|---|---|
| 8,818,961 | B1 | 8/2014 | Beatty et al. |
| 11,321,491 | B2 | 5/2022 | Ossig et al. |
| 11,755,784 | B2 | 9/2023 | Ossig et al. |
| 2004/0171373 | A1 | 9/2004 | Suda et al. |
| 2007/0136198 | A1* | 6/2007 | Foth .................. G06Q 20/40 705/44 |
| 2007/0136599 | A1* | 6/2007 | Suga .................. H04L 9/3247 713/176 |
| 2008/0114791 | A1 | 5/2008 | Takatsu et al. |
| 2008/0201277 | A1 | 8/2008 | Ozdemir et al. |
| 2009/0210324 | A1 | 8/2009 | Bhogal et al. |
| 2011/0107320 | A1 | 5/2011 | Flisakowski et al. |
| 2012/0117022 | A1 | 5/2012 | Collomb et al. |
| 2015/0207645 | A1 | 7/2015 | Kanabar et al. |
| 2015/0254463 | A1* | 9/2015 | Ryhorchuk .......... H04L 9/3247 713/176 |
| 2016/0088286 | A1* | 3/2016 | Forsythe ............ G06Q 30/0623 348/46 |
| 2016/0162478 | A1 | 6/2016 | Blassin et al. |
| 2016/0371622 | A1 | 12/2016 | Kurian et al. |
| 2017/0279783 | A1* | 9/2017 | Milazzo .................... H04L 9/14 |
| 2017/0372392 | A1* | 12/2017 | Metnick ............ G06Q 30/0613 |
| 2018/0025181 | A1 | 1/2018 | Barinov et al. |
| 2018/0082043 | A1 | 3/2018 | Witchey et al. |
| 2018/0096080 | A1* | 4/2018 | Voigt .................... G06F 16/254 |
| 2018/0096081 | A1* | 4/2018 | Voigt ................ G06F 16/90335 |
| 2018/0130050 | A1* | 5/2018 | Taylor .................. G06Q 20/065 |
| 2018/0145836 | A1* | 5/2018 | Saur .................... G06Q 20/3829 |
| 2018/0157651 | A1* | 6/2018 | Smith .................... G06F 16/164 |
| 2018/0288145 | A1 | 10/2018 | Levy et al. |
| 2018/0300741 | A1 | 10/2018 | Leonard et al. |
| 2018/0307514 | A1 | 10/2018 | Koutyrine et al. |
| 2019/0013934 | A1 | 1/2019 | Mercuri et al. |
| 2019/0163793 | A1 | 5/2019 | Buehler et al. |
| 2019/0287200 | A1 | 9/2019 | Schuler et al. |
| 2020/0007322 | A1 | 1/2020 | Weldemariam et al. |
| 2020/0019717 | A1 | 1/2020 | Steffey et al. |
| 2020/0019777 | A1* | 1/2020 | Gurzoni, Jr. ......... G06V 10/803 |
| 2020/0059363 | A1 | 2/2020 | Lobo et al. |
| 2020/0073657 | A1* | 3/2020 | Robison .................. G06F 21/57 |
| 2020/0265324 | A1 | 8/2020 | Ferreira Moreno et al. |

OTHER PUBLICATIONS

European Office Action for Application No. 20185662.2, dated Nov. 2, 2020, 7 pages.

\* cited by examiner

TRACKING DATA ACQUIRED BY COORDINATE MEASUREMENT DEVICES THROUGH A WORKFLOW

CROSS-REFERENCE TO RELATED APPLICATIONS

This application is a continuation of U.S. patent application Ser. No. 17/687,791, filed on Mar. 7, 2022, which is a continuation of U.S. patent application Ser. No. 16/520,585 filed on Jul. 24, 2019, now issued as U.S. Pat. No. 11,321,491 on Jun. 23, 2022, the contents of which are incorporated by reference herein in their entirety.

BACKGROUND

The subject matter described herein relates in general to data security and traceability, and in particular to tracking data acquired by coordinate measurement devices through a workflow.

The integrity of digital data can be verified through the use of digital security functions such as cryptographic hash functions, where a cryptographic hash function is applied to contents of a file to calculate a digital security attribute, such as a hash code, for the file. A user subsequently accessing the file can verify that contents of the file have not been altered, modified, or corrupted by applying the same cryptographic hash function to the file, or to a copy of the file, to calculate a new hash code, or other digital security attribute, which is compared to the original hash code. If the new hash code matches the original hash code, then the file has not been altered. With three-dimensional (3D) scan data and other digital assets now being used in public safety applications, cryptographic hash functions can be used to assure that the information gathered at the scene is not altered during the process of the investigation.

Typically, file authenticity is confirmed using a cryptographic hash function when a file has been copied and moved to a destination computer. Once authenticity is confirmed, the user can open the file and execute the required processes and analysis with the data in the file. Users following best practices will check the hash code every time that the file is loaded or opened in order to be confident that someone did not tamper with the data in the file since the last time they worked with the file and/or that it was transferred or copied to a new destination without errors. The process of checking the hash code is not integrated into a user's workflow so it is more likely to be skipped as it provides a burden on the user to ensure that it is completed. This process can be cumbersome and time consuming, and oftentimes after the file is checked once on a computer the user generally trusts that is has not changed. Contemporary tools are not available to verify that any purposeful changes to the asset were documented, or logged, and that only desired and verifiable changes are included in the new version of the digital asset.

In the area of public safety and cases that end up going to a judicial trial it is desired that the user follow practices that verify the authenticity of the file each time that they access the file. The steps taken to ensure file integrity of scans and digital evidence assets throughout the investigative period should be documented to ensure that the evidence presented can withstand scrutiny during cross examination and questions from expert witnesses.

Accordingly, while data security processes are suitable for their intended purposes, what is needed is a data security process having certain features of embodiments of the present invention.

BRIEF DESCRIPTION

According to an embodiment of the present invention, a method for tracking a digital asset is provided. The method includes providing a database for storing meta-data that describes steps in a workflow and an order of the steps in the workflow. The meta-data includes, for each of the steps: a description of an input data file for the step; a description of a transaction performed at the step; and a description of an output data file generated by the step based at least in part on applying the transaction to the input data file. Data that includes meta-data for a step in the workflow is received and the data is stored in the database. A trace of the workflow is generated based at least in part on contents of the database. The generating is based on receiving a request from a requestor for the trace of the workflow. At least a subset of the trace is output to the requester.

In addition to one or more of the features described herein, or as an alternative, further embodiments of the method may include that an input data file for a first step in the workflow is acquired by a coordinate measurement device.

In addition to one or more of the features described herein, or as an alternative, further embodiments of the method may include that the coordinate measurement device includes a photogrammetry device.

In addition to one or more of the features described herein, or as an alternative, further embodiments of the method may include that the coordinate measurement device includes a scanner.

In addition to one or more of the features described herein, or as an alternative, further embodiments of the method may include that the trace includes a chain of custody.

In addition to one or more of the features described herein, or as an alternative, further embodiments of the method may further include recreating a version of an output data file at a selected point in time based at least in part on contents of the database.

In addition to one or more of the features described herein, or as an alternative, further embodiments of the method may include that the metadata further includes a time stamp of a time of an update to the output data file, an identifier of a person or processor initiating the update, and a pointer to a location of the output data file.

In addition to one or more of the features described herein, or as an alternative, further embodiments of the method may include that the database is used to implement a blockchain, with each block in the blockchain representing a step in the workflow and the blockchain being utilized to provide proof of non-manipulated data.

In addition to one or more of the features described herein, or as an alternative, further embodiments of the method may include that at least one block in the blockchain is digitally signed by a creator of the at least one block.

In addition to one or more of the features described herein, or as an alternative, further embodiments of the method may include that the database provides a template for the workflow.

In addition to one or more of the features described herein, or as an alternative, further embodiments of the method may further include applying the workflow to new input data.

In addition to one or more of the features described herein, or as an alternative, further embodiments of the method may include that the database is used to implement event sourcing.

In addition to one or more of the features described herein, or as an alternative, further embodiments of the method may include that the data documents a crime scene or an accident scene.

In addition to one or more of the features described herein, or as an alternative, further embodiments of the method may include that an input data file for a first step in the workflow is acquired by a three dimensional (3D) camera.

According to an embodiment of the present invention, a system for tracking a digital asset is provided. The system includes a memory having computer readable instructions and one or more processors for executing the computer readable instructions. The computer readable instructions control the one or more processors to perform operations that include providing a database for storing meta-data that describes steps in a workflow and an order of the steps in the workflow. The meta-data includes, for each of the steps: a description of an input data file for the step; a description of a transaction performed at the step; and a description of an output data file generated by the step based at least in part on applying the transaction to the input data file. Data that includes meta-data for a step in the workflow is received and the data is stored in the database. A trace of the workflow is generated based at least in part on contents of the database. The generating is based on receiving a request from a requestor for the trace of the workflow. At least a subset of the trace is output to the requestor.

In addition to one or more of the features described herein, or as an alternative, further embodiments of the system may include that an input data file for a first step in the workflow is acquired by a coordinate measurement device.

In addition to one or more of the features described herein, or as an alternative, further embodiments of the system may include that the trace includes a chain of custody.

In addition to one or more of the features described herein, or as an alternative, further embodiments of the system may include that the operations further include recreating a version of an output data file at a selected point in time based at least in part on contents of the database.

In addition to one or more of the features described herein, or as an alternative, further embodiments of the system may include that the database is used to implement a blockchain, with each block in the blockchain representing a step in the workflow and the blockchain being utilized to provide proof of non-manipulated data.

In addition to one or more of the features described herein, or as an alternative, further embodiments of the system may include that the database provides a template for the workflow.

In addition to one or more of the features described herein, or as an alternative, further embodiments of the system may include that the operations further include applying the workflow to new input data.

According to an embodiment of the present invention, a computer program product for tracking digital assets includes a computer readable storage medium having program instructions embodied therewith, the program instructions executable by a processor to cause the processor to perform operations. The operations include providing a database for storing meta-data that describes steps in a workflow and an order of the steps in the workflow. The meta-data includes, for each of the steps: a description of an input data file for the step; a description of a transaction performed at the step; and a description of an output data file generated by the step based at least in part on applying the transaction to the input data file. Data that includes meta-data for a step in the workflow is received and the data is stored in the database. A trace of the workflow is generated based at least in part on contents of the database. The generating is based on receiving a request from a requestor for the trace of the workflow. At least a subset of the trace is output to the requestor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
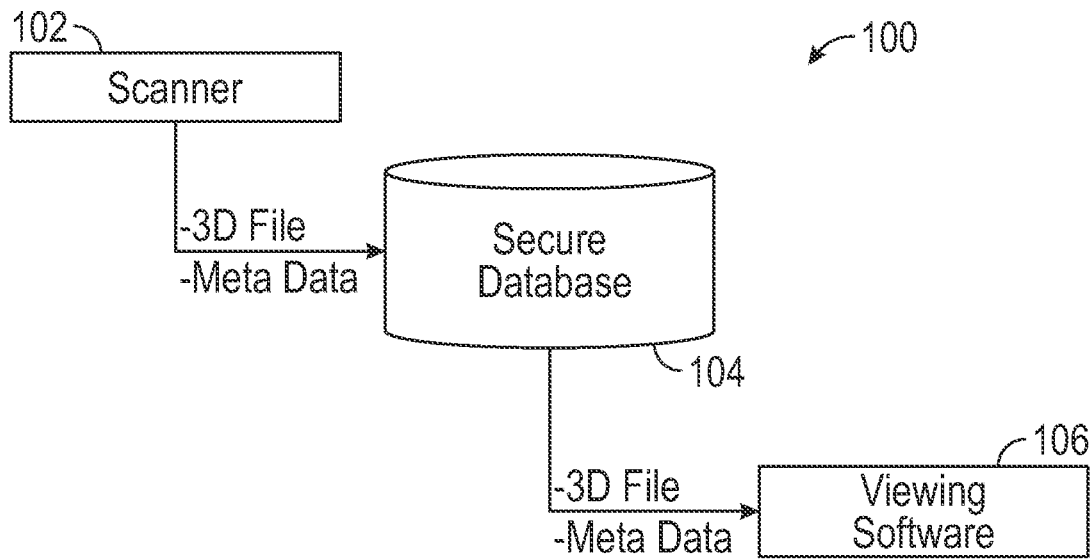
FIG. 1 is a schematic illustration of components of a system for storing data acquired by a coordinate measurement device in a secure database in accordance with one or more embodiments of the present invention.

The detailed description explains embodiments of the invention, together with advantages and features, by way of example with reference to the drawings.

DETAILED DESCRIPTION

Embodiments of the present invention relate to using a secure database to create a traceable workflow for data processing. Embodiments can be used to track data acquired by coordinate measurement devices to provide a traceable record from the time that the data is captured/acquired, covering all of the steps in the data processing workflow. Information that can be recorded at each step in the workflow includes data files that were created or modified as well as meta-data. The meta-data can include but is not limited to: transaction information such as the hardware and hardware settings utilized in the step and/or the software packages including version levels utilized in the step; people involved in performing the step; and/or a timestamp indicating when the step was performed. This information which includes proof of how the data was captured/acquired and processed can be used to provide a chain of custody to show that the data has not been tampered with, altered, manipulated and/or subject to unauthorized modifications.

As used herein, the term "chain of custody" refers to a trace of the movement and location of electronic evidence from the time that it is obtained until the time that it is presented, for example in a judicial court. A chain of custody can include proof that the electronic evidence is what it purports to be (e.g., scan data captured at a crime scene), proof of continuous possession by one or more people or entities from the time that it was captured until it is presented, and proof that the electronic evidence was not altered by any of the people or entities during their possession of the electronic evidence. An example of electronic evidence is data documenting a crime scene that includes raw coordinate scan data that was captured/acquired at the crime scene and manipulations of the raw scan data into data documenting the crime scene.

In accordance with one or more embodiments of the present invention, the secure database provides a location to store meta-data describing tasks (also referred to herein as "transactions") performed in a workflow process and pointers to data files used in the workflow process. The secure database allows the creation and any updates to the content of the data files in the workflow to be traced and can include a digital signature of any entity (e.g., scanner, person) involved in performing a task certifying that the content of the data file and/or meta-data are correct. The meta-data in the secure database may also include a time-stamp and restrict access to particular entities. In accordance with one or more embodiments of the present invention, at least a subset of the data file and the meta-data are stored in the same storage device. In accordance with one or more other embodiments of the present invention, the data file and the meta-data are stored in different storage devices.

In accordance with one or more embodiments of the present invention, the secure database is implemented using event sourcing techniques to trace the sequence of steps in a workflow that were used to generate a data file(s). The use of event sourcing techniques can be used to ensure that all steps in a workflow are stored as a sequence of events. For each event, or step, in the workflow, the input data file(s), output data file(s), and transactions applied to the input data file(s) (e.g., by a software program and/or hardware device) to generate the output data file(s) are recorded in a secure database often referred to as an "event store." in accordance with one or more embodiments of the present invention, pointers to storage locations of the data files (and not the actual data files) are stored in the secure database. Data describing new events can be appended to the event store without over-writing previous events in order to maintain the history of the steps/data in the workflow. In addition, security schemes such as, but not limited to, cryptography can be utilized to link the events together and/or to ensure that contents of the events have not been tampered with. The secure database can be implemented by a single copy of a centralized database accessible only to authorized personnel and/or computer modules.

In accordance with one or more embodiments of the present invention, the secure database is implemented using blockchain technology, such as, but not limited to private blockchain technology. As known in the art, a blockchain includes a sequential list of records (referred to as blocks) that are linked together using cryptography. Additional blocks may be appended to the blockchain and each block contains meta-data such as a cryptographic hash of the previous block, a timestamp, pointers to one or more data files, and transaction data. In accordance with one or more embodiments of the present invention, each step in the workflow is represented as a block in the blockchain and the transaction data, or transaction information, describes the processing performed at the corresponding step in the workflow. In an embodiment, whenever a block is created, information in the block is processed via a hash function to produce a hash value. This hash value is stored in the block which is appended at the end of the blockchain. Each new hash is also generated based on the hash value of a previous block, hence ensuring the authenticity of the entire blockchain. If someone tampers with information within a block, every computing device with access to the blockchain will be able to identify the tampering. Existing blockchain platforms such as, but not limited to Ethereum, Hyperledger Fabric and Quorom may be utilized by one or more embodiments of the present invention. Ethereum is an example of a public blockchain platform having blocks that are accessible to the public. Hyperledger Fabric and Quorom are examples of private blockchains having blocks that are restricted to a defined set of users.

In accordance with one or more embodiments of the present invention, by storing meta-data about the digital asset, or data file, in the secure database, data authentication and tracking are performed automatically each time that the data file is created, modified, or accessed. By automating the process, the extra work required by the user in having to verify the authenticity of a secured digital asset upon each use of the secured digital asset is eliminated. In addition, by automating the process, human error in forgetting to verify a data file and/or forgetting to log a verification of a data file can also be prevented. In accordance with one or more embodiments of the present invention, notifications that include results of the authentication are logged, and output to the user of the data file or to a third party. A communication to the user can indicate in real time (e.g., prior to the user accessing the digital asset) that all the requested or associated files have been checked and verified, and alerts can indicate any issues with the digital asset(s). Communicating the results of the authentication to the user can prevent time spent on tampered or corrupted assets and avoid wasted effort or potentially flawed analysis. The terms "digital asset" and "data file" are used interchangeably herein to refer to a computer file storing content of value to a corporation, public safety agency, or other entity.

The automated process described herein provides advantages over contemporary methods by removing the reliance on an end-user manually initiating computer software to compare files and hash codes, which is open to human error and inefficiencies. In addition, contemporary manual methods of verifying data file integrity can be time consuming and cumbersome for end-users and as a result may not be followed at all times. The automated process described herein removes the burden from the end-user and performs the verification automatically as part of the work flow when an end-user downloads a file from a secure location. Removing the reliance on end-users for performing the authenticating and automatically logging information about accesses to a secured three-dimensional (3D) data file can result in a more accurate evidentiary log for providing a chain of custody of the 3D data file.

Embodiments are described herein in terms of a 3D data file and a hash code. A 3D data file is one example of a type of data file that includes data acquired by a coordinate measurement device. Embodiments of the present invention are not limited to data files that are 3D data files and can include any type of data file containing data acquired by a coordinate measurement device or generated as part of a workflow that includes data acquired by a coordinate measurement device or in any other manner. In addition, a hash code is one example of a digital security attribute that can be generated by applying a digital security function (e.g., a hash function). Embodiments of the present invention are not limited to hash codes and hash functions and can include any type of digital security known in the art to verify the authenticity of a digital asset. For example, other types of digital security that can be implemented by embodiments include, but are not limited to digital signatures, ciphers, cryptographic sponges, fingerprints, check digits, and checksums.

Turning now to FIG. 1, a schematic illustration of components 100 of a system for storing and retrieving data acquired by a coordinate measurement device in a secure database is generally shown in accordance with one or more embodiments of the present invention. The components 100 shown in FIG. 1 include scanner 102, secure database 104, and viewing software 114. The scanner 102 shown in FIG. 1 can be executing scan processing software such as SCENE™ software which is manufactured by FARO Technologies, Inc. of Lake Mary, Florida to create a three-dimensional (3D) coordinate data file that in the example shown in FIG. 1 is stored in the secure database 104 along with meta-data that includes transaction data that describes how the 3D file was created (e.g., scanner type and version, software type and version, timestamp, etc.), attributes of the 3D file (e.g., size, format, etc.), and/or steps in a workflow associated with creating the 3D file. The data file and the meta-data are referred to herein collectively as data. In accordance with one or more embodiments of the present invention, the scanner 102 and the secure database 104 are located in different geographic locations and communicatively coupled via a network.

In an embodiment, the scanner 102 is a coordinate measurement device, or metrology device, such as a 3D laser scanner time-of-flight (TOF) coordinate measurement device that generates 3D representations of areas, such as crime scenes or accident scenes for example. A 3D laser scanner of this type steers a beam of light to a non-cooperative target such as a diffusely scattering surface of an object. A distance meter in the device measures a distance to the object, and angular encoders measure the angles of rotation of two axes in the device. The measured distance and two angles enable on a processor in the device to determine the 3D coordinates of the target. It should be appreciated that while embodiments herein describe the data as being acquired by a coordinate measurement device that is a TOF laser scanner device, this is for exemplary purposes and the claims should not be so limited. In other embodiments, the coordinate measurement device may be an articulated arm coordinate measurement machine, a laser line probe, a triangulation scanner, an area scanner, a structured light scanner, a photogrammetry device, a 2D camera used in a photogrammetry application, a videogrammetry device, a range camera, a RGB-D camera, a total station, a theodolite or a laser tracker for example. As used herein, a range camera or an RGB-D camera is a camera that acquires a two-dimensional image with depth information. The data acquired by the coordinate measurement device may include measurement data, coordinate data, 2D images, angles, audio recordings, or video recordings. The coordinate data may be either two-dimensional (2D) or three-dimensional (3D) coordinate data.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object. Raw scan data is an example of one kind of a 3D file that can be output by scanner 102.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

Though not shown in FIG. 1, devices other than a scanner 102 such as, but not limited to articulated arm coordinate measurement machines, a laser line probes, triangulation scanners, area scanners, structured light scanners, photogrammetry devices, videogrammetry devices or laser trackers can be used by one or more embodiments to generate 3D files. Contents of the 3D data files and meta-data can include, but are not limited to data, images, transformation data, calibration information, and certification results.

As described previously, the secure database 104 may be implemented by a blockchain platform. As known in the art, a blockchain is a continuously growing list of records, called blocks, that are linked and secured using cryptography. Each block typically contains a cryptographic hash of the previous block, a timestamp, and data. In one or more embodiments of the present invention, the data includes the 3D file and meta-data describing the 3D file and/or a step in a workflow that operates on the data. In one or more other embodiments of the present invention, the block includes a pointer to the data file (e.g., a 3D data file) which is stored in another location and meta-data describing the 3D file and/or a step in a workflow that operates on the data file. By design, a blockchain is inherently resistant to modification of the data in the blocks. Once recorded, the data in any given block cannot be altered retroactively without the alteration of all subsequent blocks.

Cryptographic hash functions are designed to prevent being able to reverse the hash codes they create back into the original data, and they can be used to verify the authenticity of the data stored in the secure database 104. Two files can be assured to be identical if the hash codes generated from each file, using the same cryptographic hash function, are identical. In accordance with one or more embodiments of the present invention, cryptographic hash functions can be implemented by any cryptographic hash function known in the art such as, but not limited to: Message Digest 4 (MD5) and Secure Hash Algorithm 1 (SHA-1).

Once a 3D data file (or a pointer to the 3D data file) and meta-data are stored in the secure database 104, viewing software 114 can request the 3D data file and optionally the meta-data from the secure database 104. In accordance with one or more embodiments of the present invention, the viewing software 114 and the secure database 104 are located in different geographic locations and communicatively coupled via a network. The viewing software 114 can be SCENE™ software which is developed by FARO Technologies, Inc. of Lake Mary, Florida. Depending on the type of 3D data file and the type of analysis being performed by an end-user, software other than viewing software 114 can be used by one or more embodiments to access a 3D data file in a secure manner. Examples of other types of software include but are not limited to: software that is used to edit, clean, and prepare the digital assets; and software that is used for analysis, simulation and presentation of the assets for investigative purposes or for presentation as evidence or testimony in a hearing or trial.

In accordance with one or more embodiments of the present invention, the 3D data file can be a single file or a group of files.

In accordance with one or more embodiments, a scanner generates a laser scan that is stored as a set of scan files in a directory on a storage medium such as, but not limited to a secure digital (SD) memory card. Examples of scan files can include but are not limited to: binary files containing sensor data; and text files containing scan meta-data such as the time the scan was captured, and the scan parameters provided by the user. In an embodiment, the scanner can create a textual digest file containing the names of all scan data files that make up the laser scan and store the digest file on the SD card as meta-data.

To validate that a scan file was not manipulated (e.g., to validate a chain of custody of the set of scan files), the validator can recalculate the digest hash code in the same way that the scanner did during the scan. If one or more scan files listed in the digest have changed, then their hash codes will be different. If one or more of the hash codes are different, then the digest will be different and in turn the hash code of the digest will be different than that calculated by the scanner. The validator can perform automatic checking by using a tool that validates the signature of the digest hash code. If the check is successful, this proves that the hash code was generated by the scanner and has not been recalculated by some other entity. The checking can also be performed manually by the validator, with the validator comparing the hash code of the digest that the validator calculated with the hash code of the digest that was shown on the GUI of the scanner at the scan site. When the manual method is used, the hash code shown on the GUI of the scanner must have been written down and secured by a trusted entity (e.g., a public safety official or a police officer located on-site where the scans are performed).

In an embodiment, a hash function is applied to a combination of a scan file and a unique attribute of the scanner such as, but not limited to a serial number of the scanner, a calibration value associated with the scanner, or a media access control (MAC) address of scanner. This can be used as a digital signature to associate or tie the scan file(s) to a particular scanner.

Figure 2:
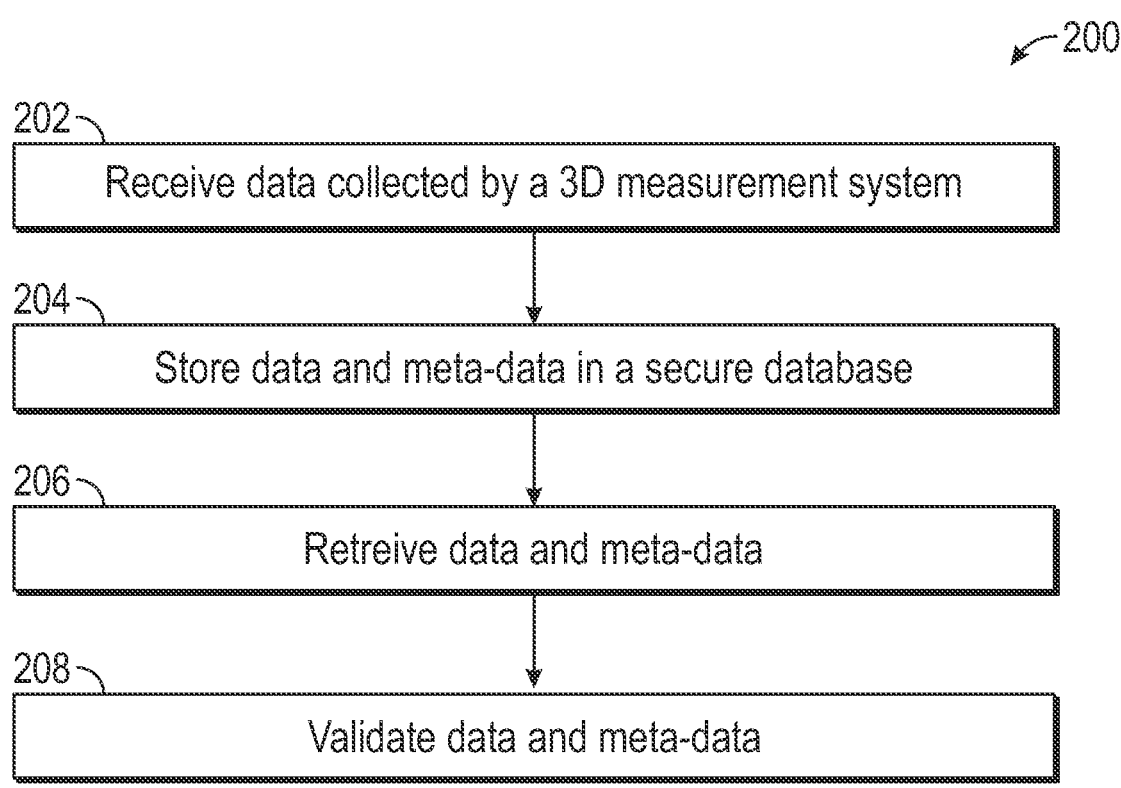
FIG. 2 is a flow diagram illustrating a method for adding data to and retrieving data from a secure database in accordance with one or more embodiments of the present invention.

Turning now to FIG. 2, a flow diagram 200 illustrating a method for adding data to and retrieving data from a secure database is generally shown in accordance with one or more embodiments of the present invention. In an embodiment, the processing shown in FIG. 2 is performed by computer instructions executing by one or more of scanner 102, secure database 104, and viewing software 106. At block 202, scan data collected by a coordinate measurement device, such as scanner 102 of FIG. 1, is received. The scan data can include, for example, a 3D data file(s) that includes a point cloud representing an accident scene or a crime scene. The scan data can also include meta-data that describes the 3D file, such as, but not limited to a description of the computer software (including version level) that was used to create the 3D data file, settings on the scanner when the scan data was collected, and/or steps in workflow.

In an embodiment, the scan data is signed by a digital signature of the scanner and/or of a user operating the scanner. The digital signature may be implemented using asymmetric cryptography where a machine or user is assigned both a public key and a private key. A hash value of the scan data, including the 3D data file and the meta-data, is signed using the private key of one or both of the scanner and the user operating the scanner to generate a digital signature(s) that can be added to the meta-data. At block 204 of FIG. 2, the 3D data file (or a pointer to the 3D data file) and the meta-data are stored in a secure database, such as secure database 104 of FIG. 1. When the secure database is implemented by a blockchain, a new block can be created for the scan data and added to the end of the blockchain at block 204 of FIG. 2. In addition, the content of the new block may be encrypted using a public key. Blocks 202 and 204 of FIG. 2 can be initiated automatically (without user input) when a 3D data file is to be stored in a secure database. The processing in these blocks can be added to a workflow process that collects data from a coordinate measurement device and stores it to a secure data location. In accordance with one or more embodiments of the present invention, the processing in blocks 202 and 204 of FIG. 2 is performed only for 3D data files that are identified as requiring authentication based for example, on the contents of the 3D data file or the storage of the 3D data file.

At block 206 of FIG. 2, the data and meta-data are retrieved, for example by viewing software 106 of FIG. 1. If the data and meta-data were encrypted with a public key when they were stored, then at block 206 of FIG. 2, they are decrypted using a corresponding private key. At block 208 of FIG. 2, the contents of the data and meta-data are validated as not being changed after being stored, by applying a public key to the digital signature(s) and checking the hash. Blocks 206 and 208 of FIG. 2 can be initiated automatically (without user input) when a 3D data file is being retrieved from a secure storage location. The processing in these blocks can be added to a workflow process that retrieves data collected by a coordinate measurement device from a secure storage location.

Figure 3:
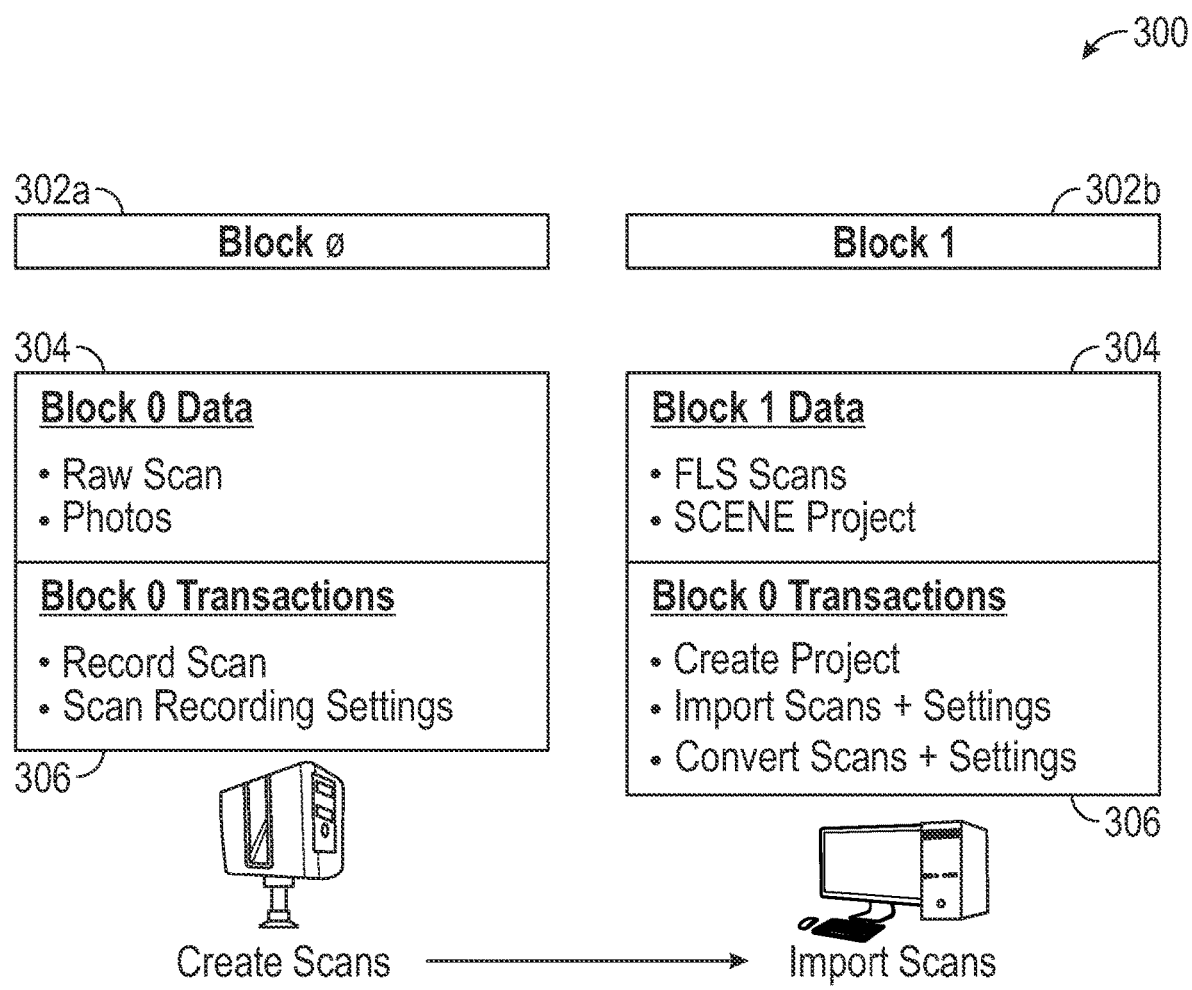
FIG. 3 is a schematic illustration of contents of data blocks in a secure database in accordance with one or more embodiments of the present invention.

Turning now to FIG. 3, a schematic illustration 300 of a data structure for storing data associated with steps in a workflow is generally shown in accordance with one or more embodiments of the present invention. FIG. 3 shows block 0 302*a* and block 1 302*b* which each correspond to a step in a workflow. Block 0 302*a* and block 1 302*b* are referred to herein collectively as blocks 302. Each block 302 includes data files 304 that are output, or generated, by the step in the workflow as well as transactions descriptions 306 that describe processing performed at the step. Block 0 302*a* includes data files 304 and transaction descriptions 306 related to a workflow step of creating scans. Block 1 302*b* includes data files 304 and transactions descriptions 306 related to a workflow step of importing scans into viewing software and creating additional data files.

Block 0 302*a* includes two transaction descriptions 306: record scan and scan recording settings, and two data files 304 are created at this step: a raw scan data file and a photos data file that are input to block 302*b* Block 302*b* includes two transaction descriptions 306: create project, import scans and the settings used during the import, and convert scans and the setting used during the converting, and two data files 304 are created at this step: FLS scan files and a SCENE project file. In an embodiment, there is one block for each portion of the workflow, and one private blockchain for each project. Having separate blockchains for each project may simplify providing a chain of custody for the project as all of the blocks in the chain are related to the project.

Figure 4:
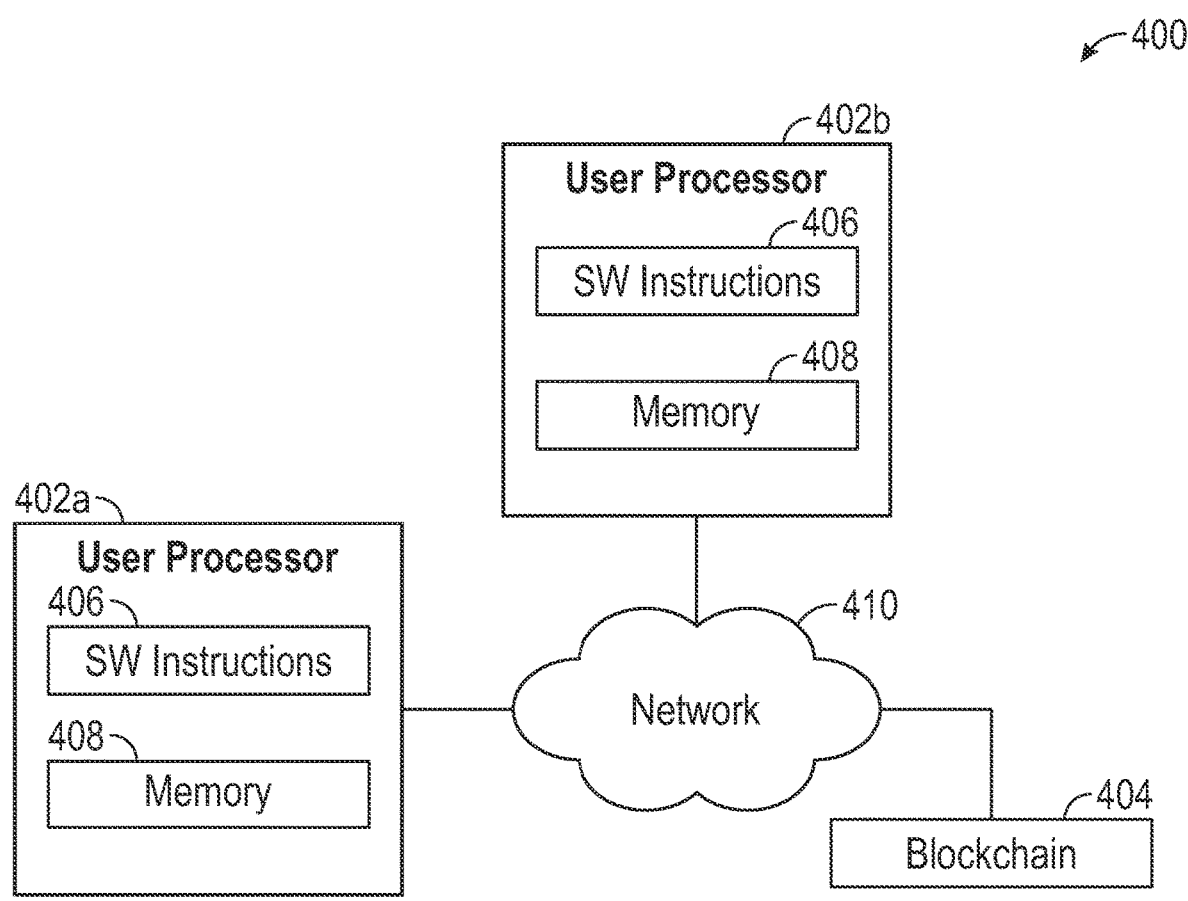
FIG. 4 is a schematic illustration of a system for tracking data acquired by a coordinate measurement device through a workflow by using a secure database in accordance with one or more embodiments of the present invention.

Turning now to FIG. 4, a schematic illustration of a system 400 for tracking data acquired by a coordinate measurement device through a workflow by using a secure database is generally shown in accordance with one or more embodiments of the present invention. The system 400 shown in FIG. 4 includes user processors 402, a secure database implemented by a blockchain 404, and network 410.

Each user processor 402 shown in FIG. 4 includes software instructions 406 for execution by the user processor 402 to retrieve, operate on, and/or to store 3D data files or other files used to perform tasks in a workflow process, as well as a memory 408 for storing, for example, local copies of the 3D data files. The memory 408 in the user processors 402 shown in FIG. 4 is contained in a user processor 402, however in other embodiments the memory 408 is a storage device external to the user processor 402. The software instructions 406 on the user processors 402 each perform at least a subset of the tasks in the workflow process represented by blockchain 404.

In the embodiment shown in FIG. 4, each user processor 402 is communicatively coupled to network 410. The system 400 shown in FIG. 4 also includes the blockchain 404 being communicatively coupled to network 110. Though shown in FIG. 4 as a single component, blockchain 404 can span multiple processors and storage devices for storing the data files, and meta-data. Contents of the blockchain 404 can be stored in any known type of memory or storage device and in any known format and are not limited to being stored in a database or other particular file format. Storage for the blockchain 404 (including data files, and meta-data) can be located on any number of storage systems such as, but not limited to a file server or network attached storage (NAS) system where there is a file system with a folder and a file structure. The blockchain 404 can also be located in an online cloud storage system(s) (e.g., remote file servers) or in a secure digital (SD) card(s) or in a universal serial bus (USB) drive(s) could be a temporary digital file collection that would want to be secured.

The network 410 shown in FIG. 4 can include one or more of any type of known networks including, but not limited to, a wide area network (WAN), a local area network (LAN), a global network (e.g. Internet), a virtual private network (VPN), and an intranet. The network 410 can include a private network in which access thereto is restricted to authorized members. The network 410 can be implemented using wireless networking technologies or any kind of physical network implementation known in the art. The components shown in FIG. 4 may be coupled to one or more other components through multiple networks (e.g., Internet, intranet, and private network) so that not all components are coupled to other components through the same network 410.

In an embodiment, user processor 402*a* is a scanner, such as scanner 102 of FIG. 1 and the software instructions 406 include scan processing software as well as additional computer instructions to perform the background processing described herein to store a 3D data file in secure storage, such as blockchain 404. The software instructions 406 can detect a request to upload a 3D data file from memory 408 to the blockchain 404. The software instructions 206 on user processor 202*a* can then store the 3D data file (or a pointer to the 3D data file) in the blockchain 404. Additional information such as, but not limited to an identifier of the 3D data file, an identifier of a user and/or user processor requesting the upload to the secure storage, and a timestamp can be included as meta-data.

In an embodiment, user processor 402*b* is a personal computer or other user device and the software instructions 406 include viewing software. In accordance with one or more embodiments of the present invention, the software instructions 406 located on both user processor 402*a* and user processor 402*b* can perform the background processing to store a 3D data file (or a pointer to the 3D data file) on the blockchain 404.

Figure 5:
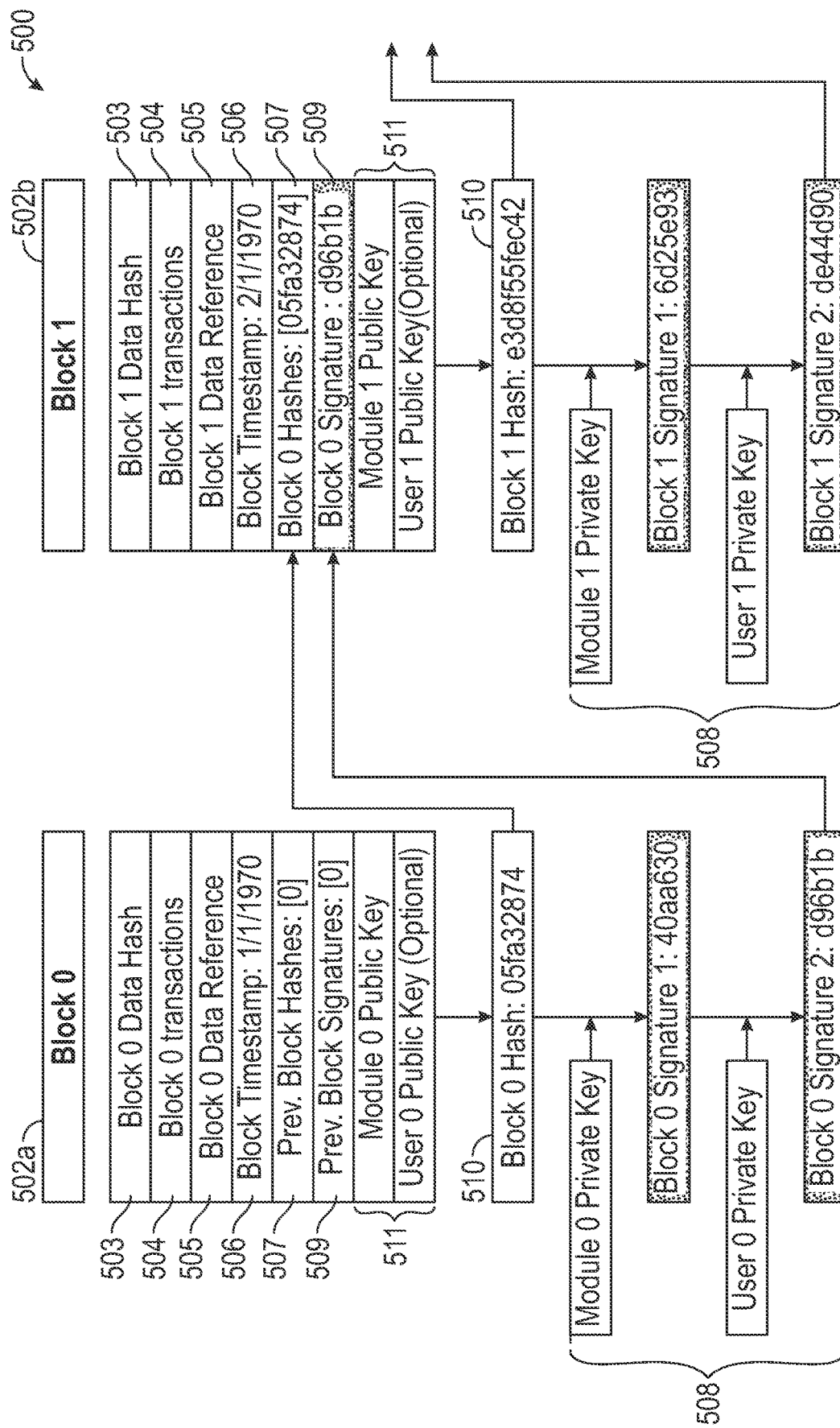
FIG. 5 is a schematic illustration of contents of data blocks in a secure database in accordance with one or more embodiments of the present invention.

Turning now to FIG. 5, a schematic illustration 500 of contents of blocks in a blockchain 500 that documents tasks, or transactions, performed as part of a workflow are generally shown in accordance with one or more embodiments of the present invention. Block 0 502*a* is the first block in the blockchain and Block 1 502*b* is the second blockchain. Block 0 502*a* and block 1 502*b* which include meta-data are referred to herein collectively as blocks 502 with each representing a step in a workflow. For ease of description, only two blocks 502 are shown in the blockchain 500 of FIG. 5 and it should be noted that embodiments are not limited to workflows having just two steps. In accordance with one or more embodiments of the present invention, meta-data about the workflow is stored in the blockchain 500 and the data files generated by the workflow are stored in another location. The blockchain 500 shown in FIG. 5 can be stored in any secure or non-secure location, such as, but not limited to: in a folder with the data files, in a container with the data files, or in a separate location from the data files. Though not shown in FIG. 5, block 1 502*b* includes a backwards pointer (or some other reference) to the location of block 0 502*a* for use in traversing backwards through the steps in the workflow represented by the blockchain 500. In addition, block 0 502*a* may include a forward pointer (or some other reference) to the location of block 1 502*b* which can be used for traversing forwards through the steps in the workflow represented by the blocks in the blockchain 500.

The example blocks 502 shown in FIG. 5 include a data reference field 505 that includes a pointer to a location of a data file created by the processing performed by the step in the workflow and described in the transactions field 504. The data hash field 503 includes a hash value associated with the contents of the data file to provide a link to the contents of the data file(s). The transactions field 504 includes a description of processing performed at that step in the workflow including for example, a description of the processing performed (e.g., filter applied to data, data captured, etc.) as well as hardware and hardware settings utilized in the step and/or software packages used to perform the step including version levels utilized at that step. In accordance with one or more embodiments of the present invention, the transactions field 504 includes enough information for a human to replicate the processing performed at the step in the workflow process represented by the block. In accordance with one or more embodiments of the present invention, where the workflow is automated, the transactions field 504 incudes enough information (e.g., in list form) for a machine (e.g., a computer) to replicate the step in the workflow process represented by the block.

The block timestamp field 506 reflects the time that the block 502 was created. The previous block hash field 507 is the hash of the contents of the previous block. For example, the previous block hash field 507 of block 1 502*b* contains the hash of the contents of block 0 502*a* (i.e., block hash 510 in block 0 502*a*). The previous block signature field 509 stores the digital signature of the previous block. For example, the previous block signature field 507 of block 1 502*b* contains the digital signature field 508 of block 0 502*a*.

In accordance with one or more embodiments of the present invention, a block 502 is created by a real person (e.g., User 0 of FIG. 5) or by an algorithm or device (e.g., Module 0 of FIG. 5).

As shown in the embodiment of FIG. 5, the digital signature field 508 is generated based on a module private key and a user private key. As shown in FIG. 5, the module private key is applied to the block hash 510 to generate "Signature 1", and the user private key is applied to "Signature 1" to generate "Signature 2." Signature 2 is stored in the previous block signature field 509 of the next block. The module private key can be associated with hardware and/or software that was applied to the data, and Signature 1 is used to verify that the specified hardware was used during the step. The user private key can be associated with a user performing the step and by signing (e.g., creating Signature 2) the user is verifying that he or she performed the step in accordance with the description in the transactions field 504. The user at the current block can apply public keys 511 to perform the verification. A block 502 can include multiple digital signatures as shown in FIG. 5, one digital signature, or no digital signatures, and different blocks in a blockchain can have different numbers of signatures.

In some cases, such as when multiple 3D scans that might have been captured with different devices by different operators are combined into one project containing the entire area of interest, multiple previous blocks 502 feed input data files into a current block. When a block 502 has multiple previous blocks, there are multiple previous block hash fields 507 and previous block signature fields 509 stored for example, in list format.

In accordance with one or more embodiments of the present invention, transactions described in the transactions field 504 are classified into different groups: trusted transactions, standard operations, and critical operations. Trusted transactions can include operations that are performed automatically by known modules or software that, for example have previously been used successfully in court to establish a chain of custody. Trusted transaction can also include transactions that have already been checked by known experts and may be signed by the known experts. In general, trusted transactions are repeatable, or reusable, and can be applied to other data files. Once a transaction is approved, an attribute in a software module that performs the transaction can be adjusted accordingly. In addition, or alternatively, there also might be a public list of trusted transactions that this can be checked by anybody everybody. Critical operations can include standard procedures performed by an operator that are not reusable such as, but not limited to the operator selects a part of a scan data file and/or the operator selects an operation to be performed on a data file. Critical operations can include manual changes that are approved and signed by the operator but can't be used in a general way. Standard operations are not signed because they cannot be applied to other data files. Standard operations can include well described methods such as, but not limited to: standard filters to remove scanning artifacts; and analysis methods calculating the expected position of a person in a crime scene. Some standard operations can be expected to become trusted transactions in the future. Critical operations generally cannot be applied to other data files and can include manual modifications to data in a data file such as, but not limited to manual deletion, manual correction, and manual modeling. Having a digital signature of a user can be particularly important for tasks that include critical operations in order to verify that the operator is trained and/or a known expert in performing the critical operations.

Figure 6:
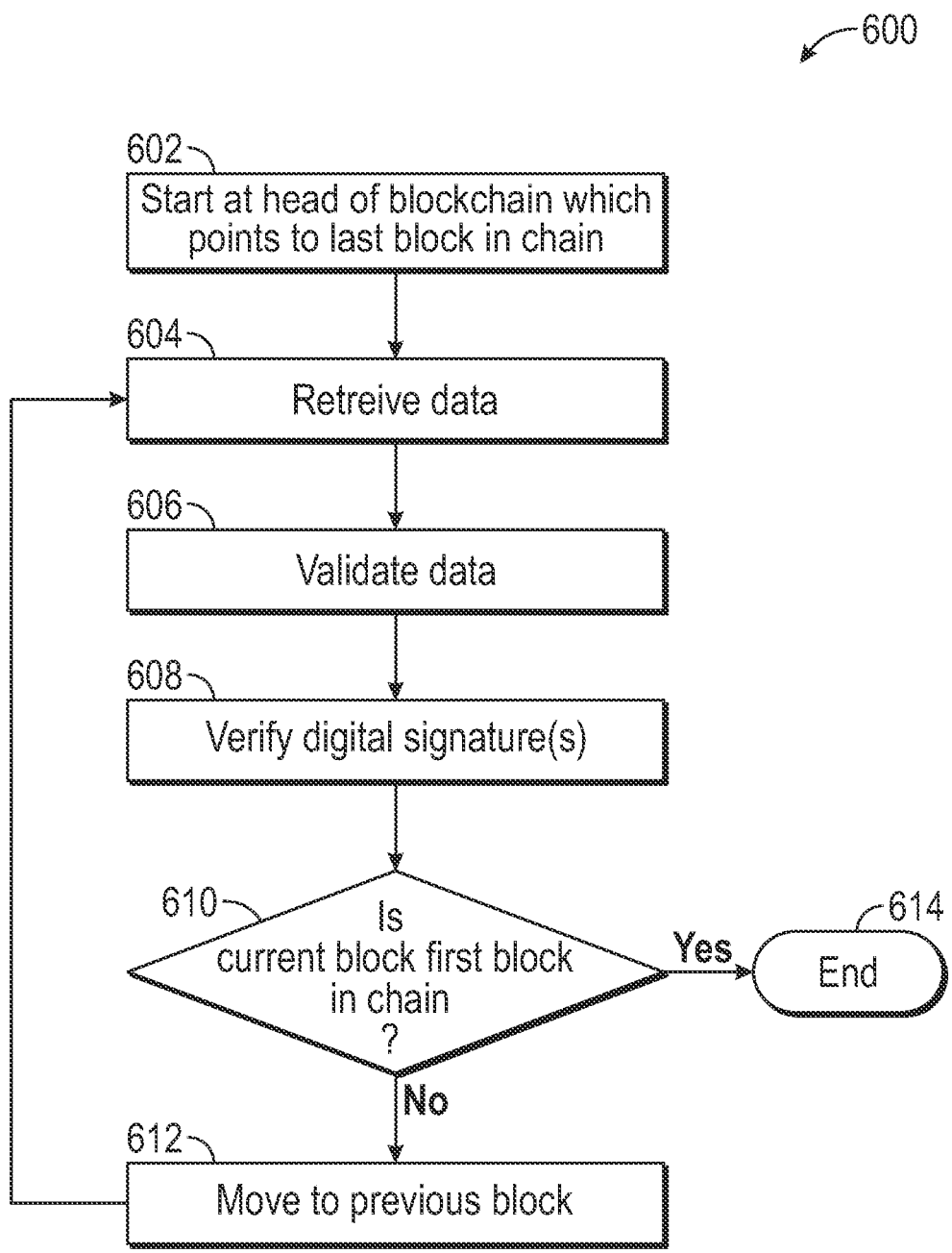
FIG. 6 is a flow diagram illustrating a method for tracking data acquired by a coordinate measurement device through a workflow using a secure database in accordance with one or more embodiments of the present invention.

Turning now to FIG. 6, a flow diagram 600 illustrating a method for tracking data acquired by a coordinate measurement device through a workflow using a secure database is generally shown in accordance with one or more embodiments of the present invention. The processing shown in FIG. 6 can be performed, for example, by user processor 402 of FIG. 4. At block 602, the process starts by accessing the head of the blockchain which includes a pointer to the last block in the chain. At block 604, the data including a data file and/or meta-data in the last block in the chain are accessed, and at block 606 the data is validated to ensure that it has not been modified since being stored in the blockchain. In accordance with one or more embodiments of the present invention, the validating includes comparing hash values of the data and not the actual data. At block 608, a digital signature in the block is verified to validate the data consistency, for example, the digital signature check makes sure that the user and/or module really did perform the process. At block 610 it is determined whether there are more blocks in the blockchain. If there are no more blocks, processing completes at block 614. If there are more blocks in the blockchain, processing continues at block 612 with moving to the previous block and performing the processing in blocks 604 through 610 for the previous block. If no errors are detected while traversing backwards through the blockchain, the contents of the blockchain represent a trace of the movement of the data file(s) through the workflow and can be presented as evidence of chain of custody. In accordance with one or more embodiments, of the present invention, a version of the data at a selected point in time can be recreated based at least in part on contents of the decentralized database.

The processing shown in FIG. 6 can be requested by an authorized requestor to generate a trace of the data that describes the data as it moves through a workflow process represented by contents of the blockchain. As used herein the term "authorized requestor" refers to a user who has been given access to contents of the entire blockchain and who has been given authority to generate the trace. In accordance with one or more embodiments of the present invention the trace is output to the authorized requestor. The trace that is output includes at least a subset of the data. An example trace output to the authorized requestor includes a plot of all chained blocks starting with the first block of meta-data, including signatures, hashes and data links. The plot can be used to check each step manually by any authorized person who would like to verify the correctness of the methods using the defined hash and cryptographic methods.

In accordance with one or more embodiments of the present invention, there are several options to verify the correct processing of the data. One option includes verifying hashes and digital signatures and includes applying these cryptographic methods to check that the processing was correct. Another option is to recreate the final data starting from scratch (i.e., starting from the first input data and using the meta-data describing the workflow). If the data was correctly processed, the result will be different only regarding dates that are stored in the data. This second option can be used to demonstrate the traceability of the system but may not be required for proof of data consistency. The second option can also be useful in applying established workflows to new data.

Figure 7:
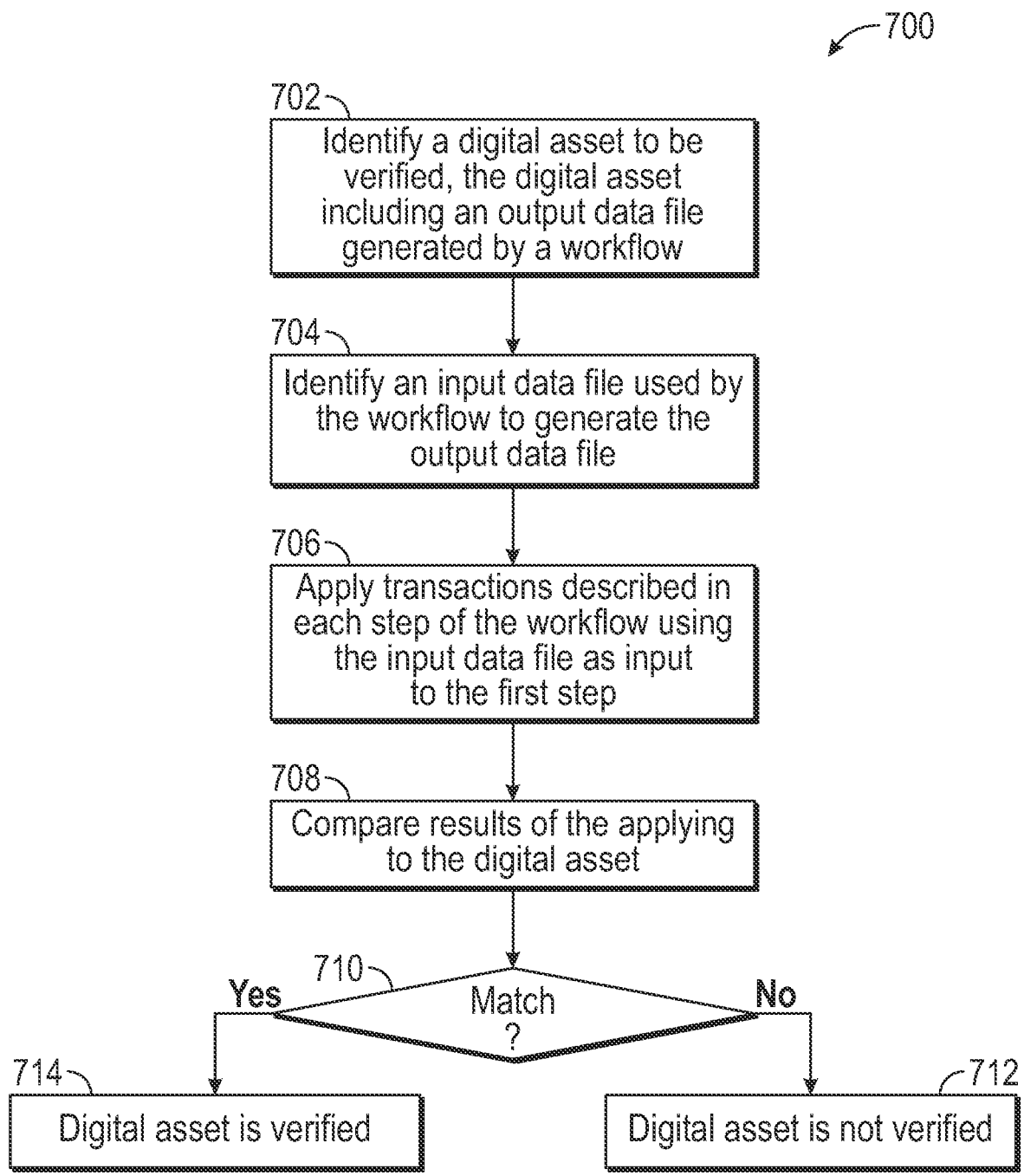
FIG. 7 is a flow diagram illustrating a method for ensuring that data output from a workflow has not been tampered with in accordance with one or more embodiments of the present invention.

Turning now to FIG. 7, a flow diagram 700 illustrating a method for ensuring that data output from a workflow has not been tampered with is generally shown in accordance with one or more embodiments of the present invention. A description of the workflow may be stored, for example, as meta-data in a secure database as described above with reference to FIGS. 3-5. The process begins at block 702 with identifying a digital asset (e.g., an output data file generated by a workflow) to be verified. At block 704, an input data file(s) used by the workflow to generate the output data file is identified. Transactions described in each step of the workflow are applied at block 706, starting with the input data file being input to the first step. The result(s) of applying the transactions (e.g., an output data file) is compared to the digital asset at block 708. The digital asset is verified at block 714 if the result(s) of applying the transactions matches the digital asset. The digital asset is determined not to be valid at block 712 when the result(s) don't match the digital asset.

In accordance with one or more embodiments of the present invention, the processing described in FIG. 7 can be started at any step within a workflow process and stopped at any step in the work flow process in order to verify a subset of the digital assets produced by the workflow process.

Figure 8:
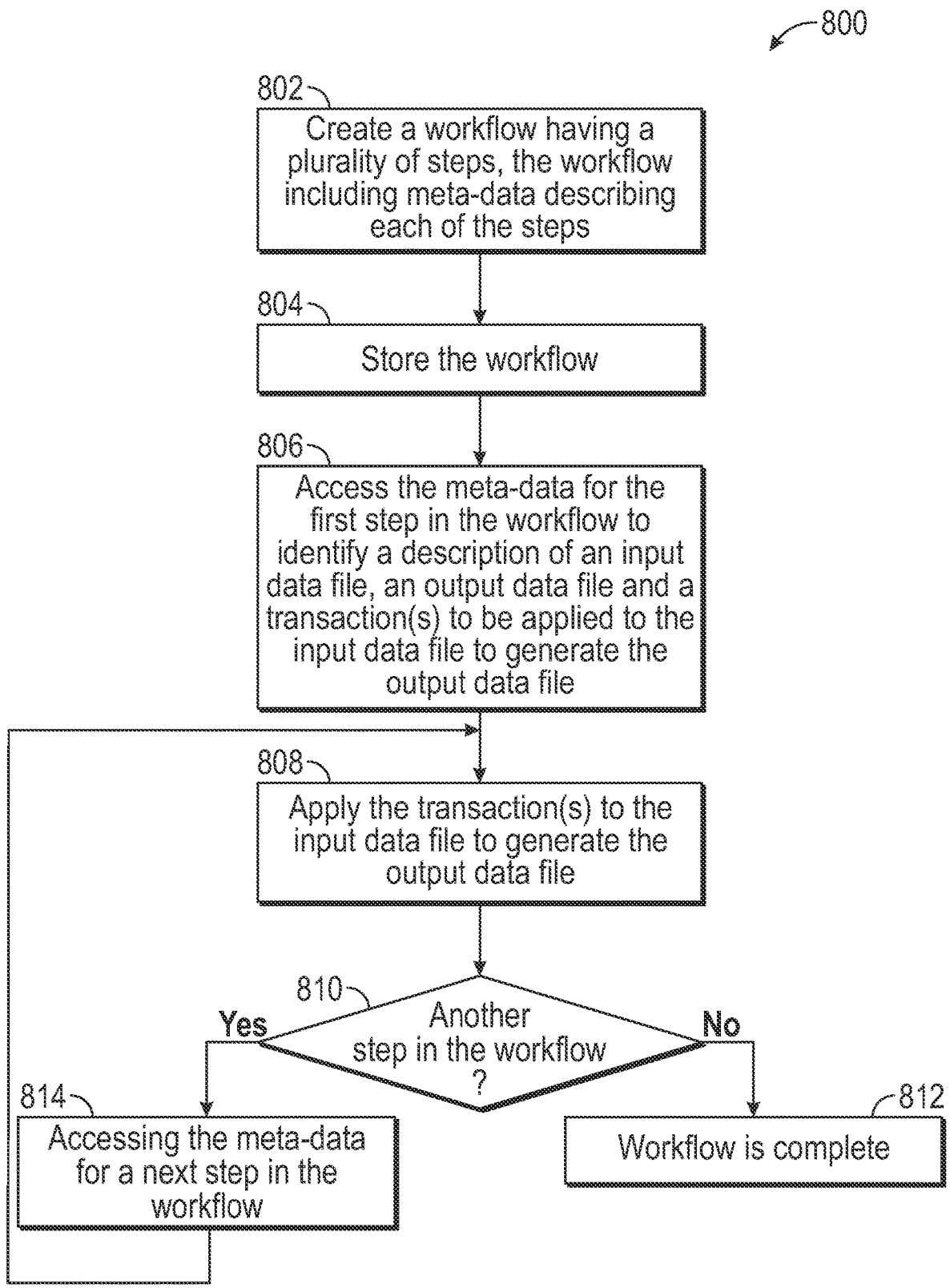
FIG. 8 is a flow diagram illustrating a method for applying a standardized workflow to an input data file in accordance with one or more embodiments of the present invention.

Turning now to FIG. 8, a flow diagram 800 illustrating a method for applying a standardized workflow to an input data file is generally shown in accordance with one or more embodiments of the present invention. A description of the workflow may be stored, for example, as meta-data in a secure database as described above with reference to FIGS. 3-5. In accordance with one or more embodiments of the present invention, the transaction descriptions from the stored workflows are used to process new input data in accordance with the standardized workflow, resulting in new output data. This provides the ability to make use of well-known and accepted procedures/workflows using the secure database (e.g., blockchain) belonging to that workflow.

The processing in FIG. 8 starts at block 802 with creating a workflow having a plurality of steps with meta-data describing each of the steps. At block 804, the workflow is stored. Processing continues at block 806 with accessing the metadata for the first step in the workflow to identify a description of an input file(s), an output file(s), and a transaction(s) to be applied to the input data file(s) to generate the output file(s). At block 808, the identified transaction(s) is applied to the input data file(s) and the output data file(s) is generated. It is determined, at block 810, whether there is another step in the workflow. If there is another step in the workflow, then block 814 is performed to access the meta-data for the next step in the workflow, and processing continues at block 808. If there is not another step in the workflow, then block 812 is performed and the workflow is complete. The output data file(s) can be output at block 812.

In accordance with one or more embodiments of the present invention, the stored workflow is a workflow that has been previously used successfully in court to provide evidence. The processing shown in FIG. 8 allows the application of a signed (e.g., verified by experts as working in court) workflow to new data. In accordance with one or more embodiments, the stored workflow contains signatures of a current operator and of an expert certifying that this is a well proven procedure.

One or more embodiments of the present invention can be used when creating experts that are certified operators. For example, a trainer can provide a signature to a trainee after the trainee has been successfully trained. This can be used as a verification that the new expert is certified. In accordance with embodiments, the signature can be a signature of an authorized institute.

Referring now to FIGS. 9-12, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

Figure 9:
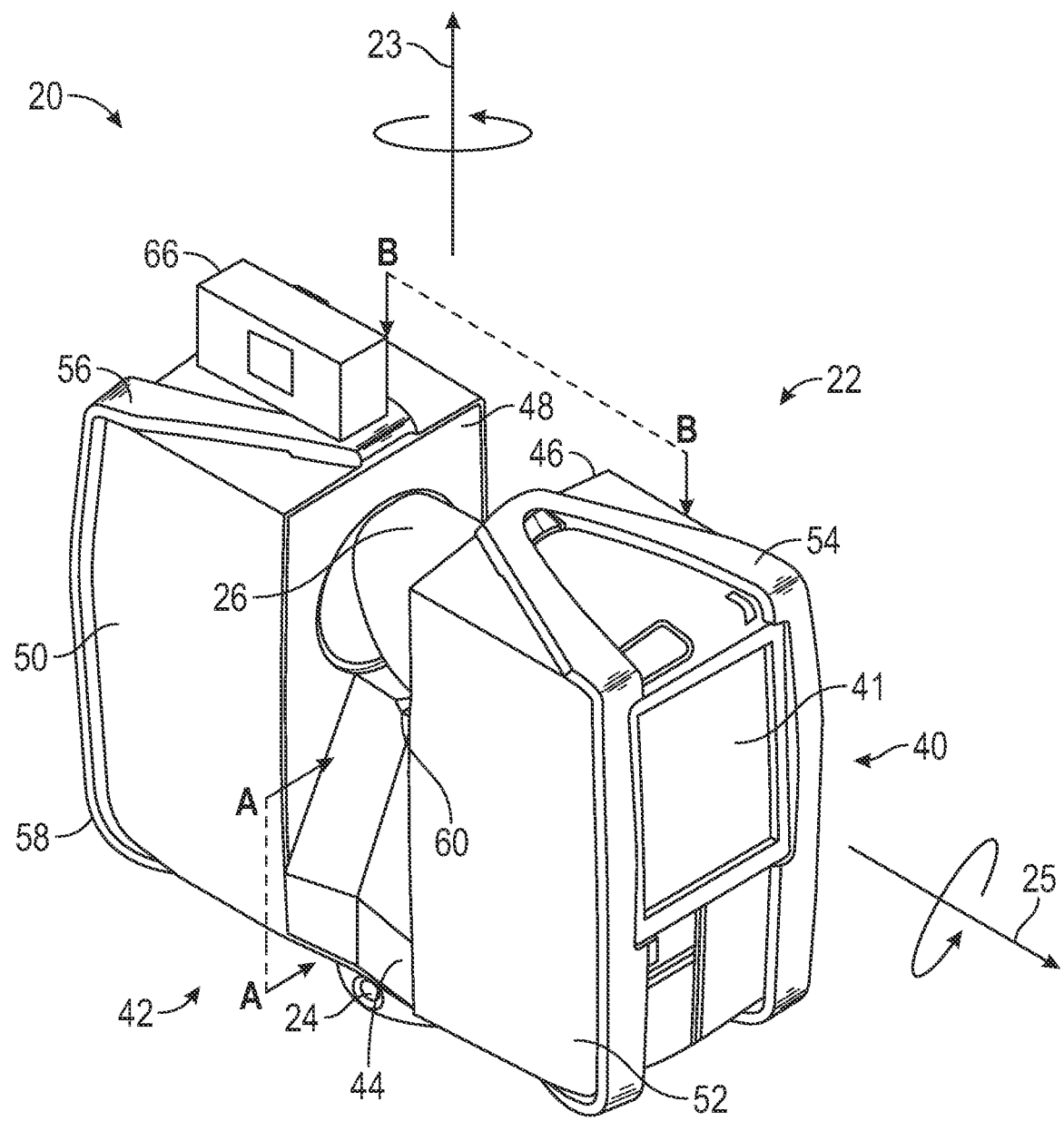
FIG. 9 is a perspective view of a laser scanner in accordance with an embodiment of the invention.

The measuring head 22 may include a display device 40 integrated into the laser scanner 20. The display device 40 may include a graphical touch screen 41, as shown in FIG. 9, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 10:
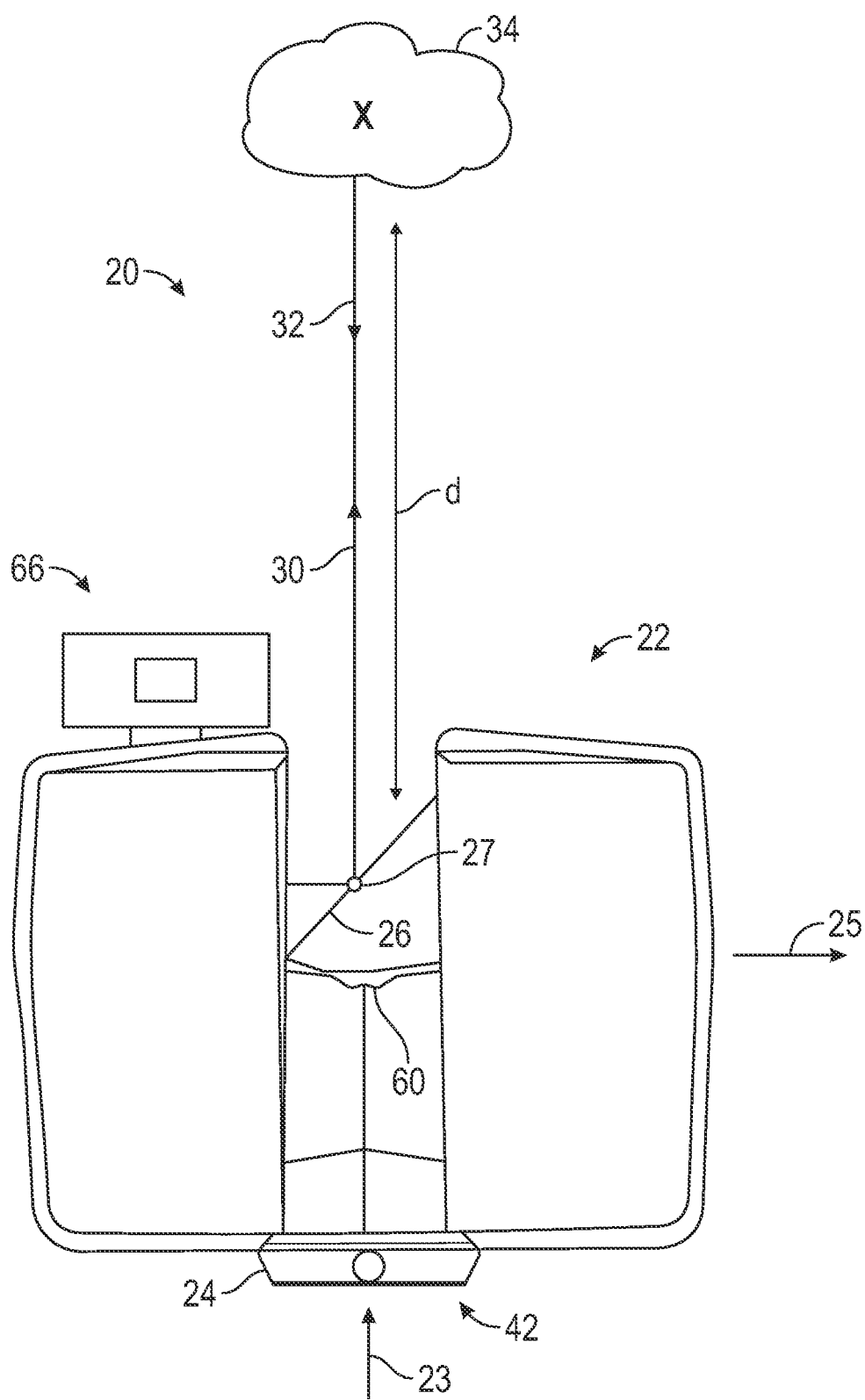
FIG. 10 is a side view of the laser scanner illustrating a method of measurement according to an embodiment.
Figure 11:
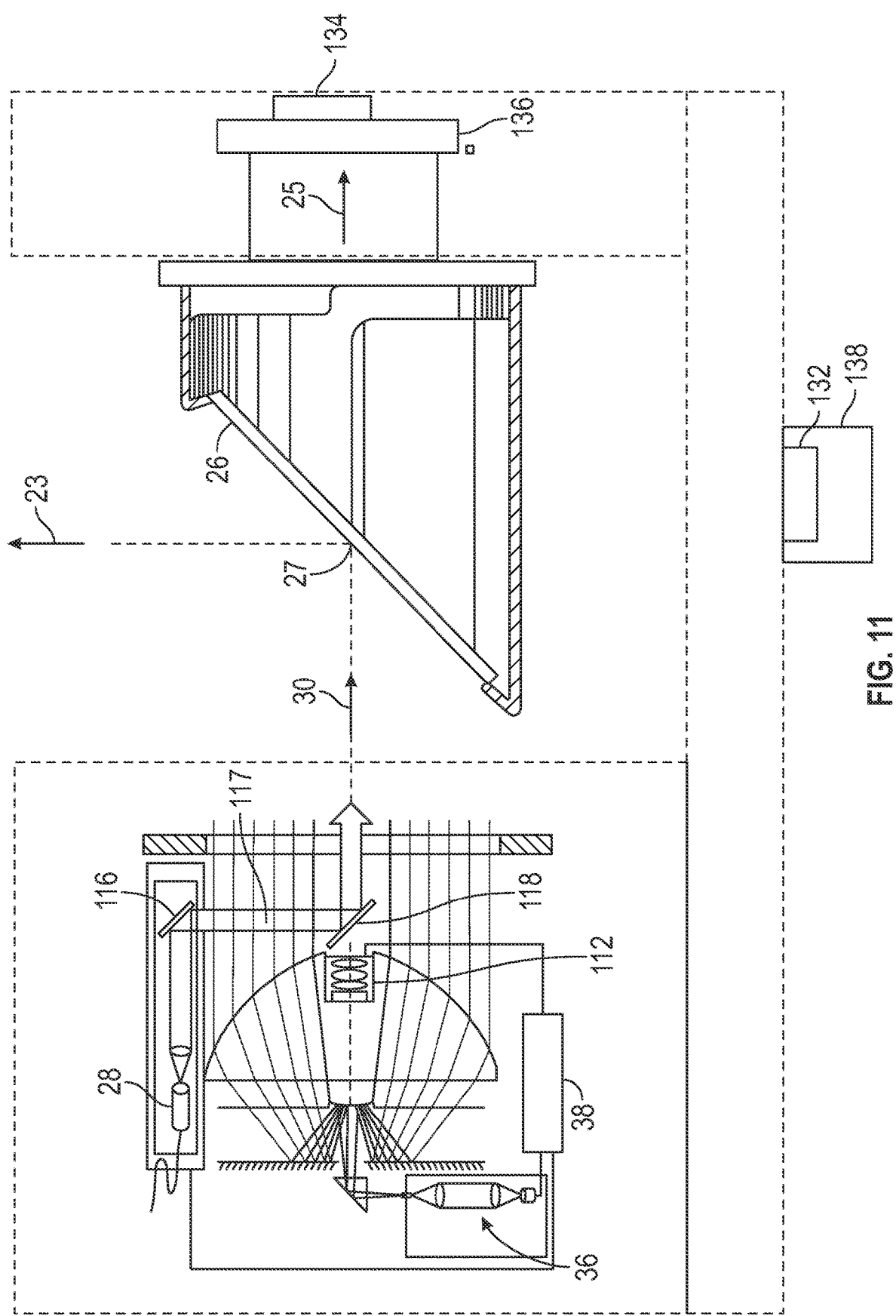
FIG. 11 is a schematic illustration of the optical, mechanical, and electrical components of the laser scanner according to an embodiment.
Figure 12:
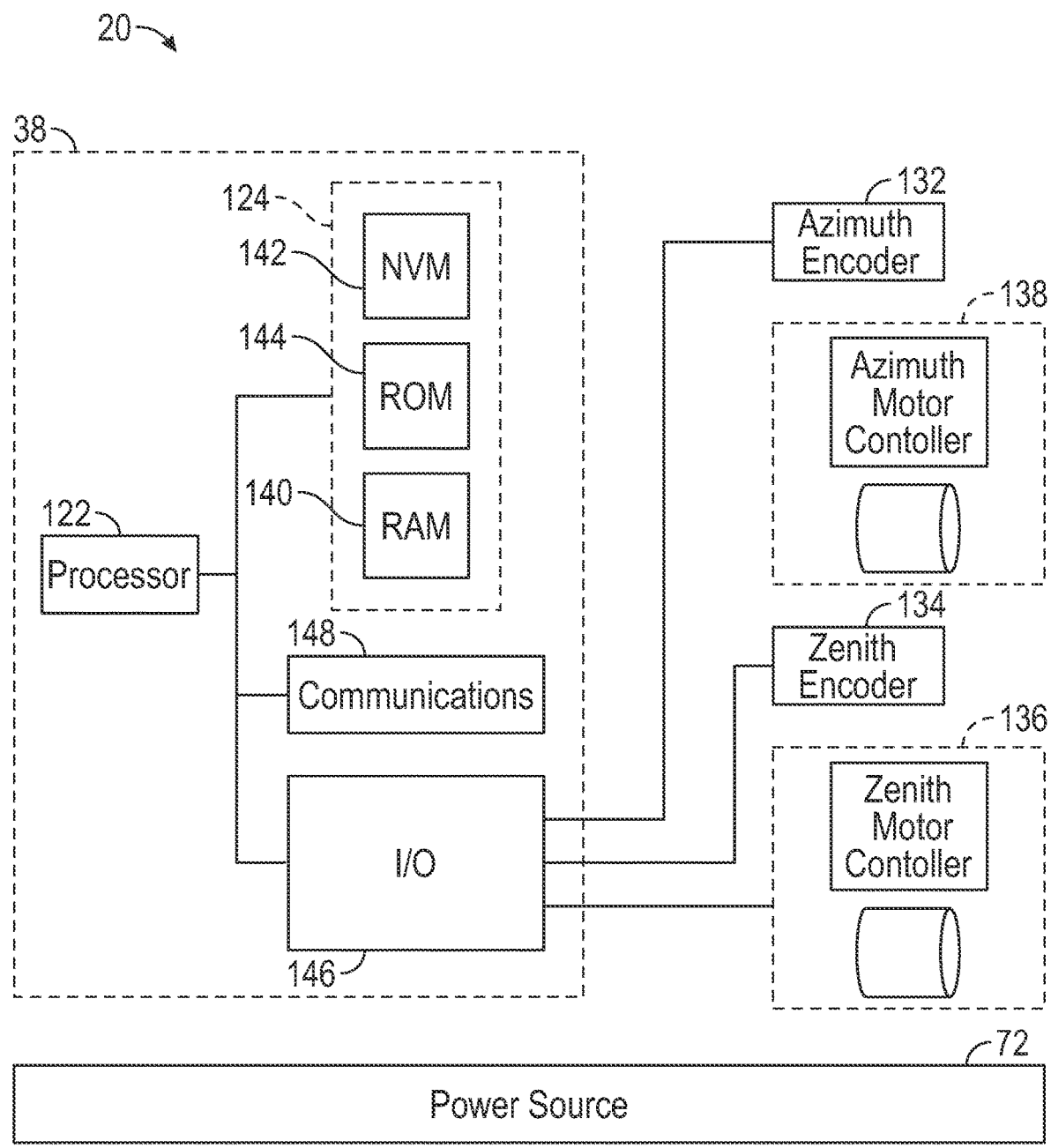
FIG. 12 illustrates a schematic illustration of the laser scanner of FIG. 9 according to an embodiment.

Referring now to FIG. 12 with continuing reference to FIGS. 9-11, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(ˆ) Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

It should be appreciated that while embodiments herein describe a coordinate measurement device in reference to laser scanner 32, this is for exemplary purposes and the claims should not be so limited. In other embodiments, the scan processing software may be executed on, or receive data from, any coordinate measurement device capable of measuring and determining 3D coordinates of an object or the environment. The coordinate measurement device may be but is not limited to: an articulated arm coordinate measurement machine, a laser tracker, an image scanner, a photogrammetry device, a triangulation scanner, a laser line probe, or a structured light scanner for example.

It is understood in advance that although this disclosure describes providing secure data in 3D software applications in reference to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. In essence, cloud computing is an infrastructure made up of a network of interconnected nodes.

Figure 13:
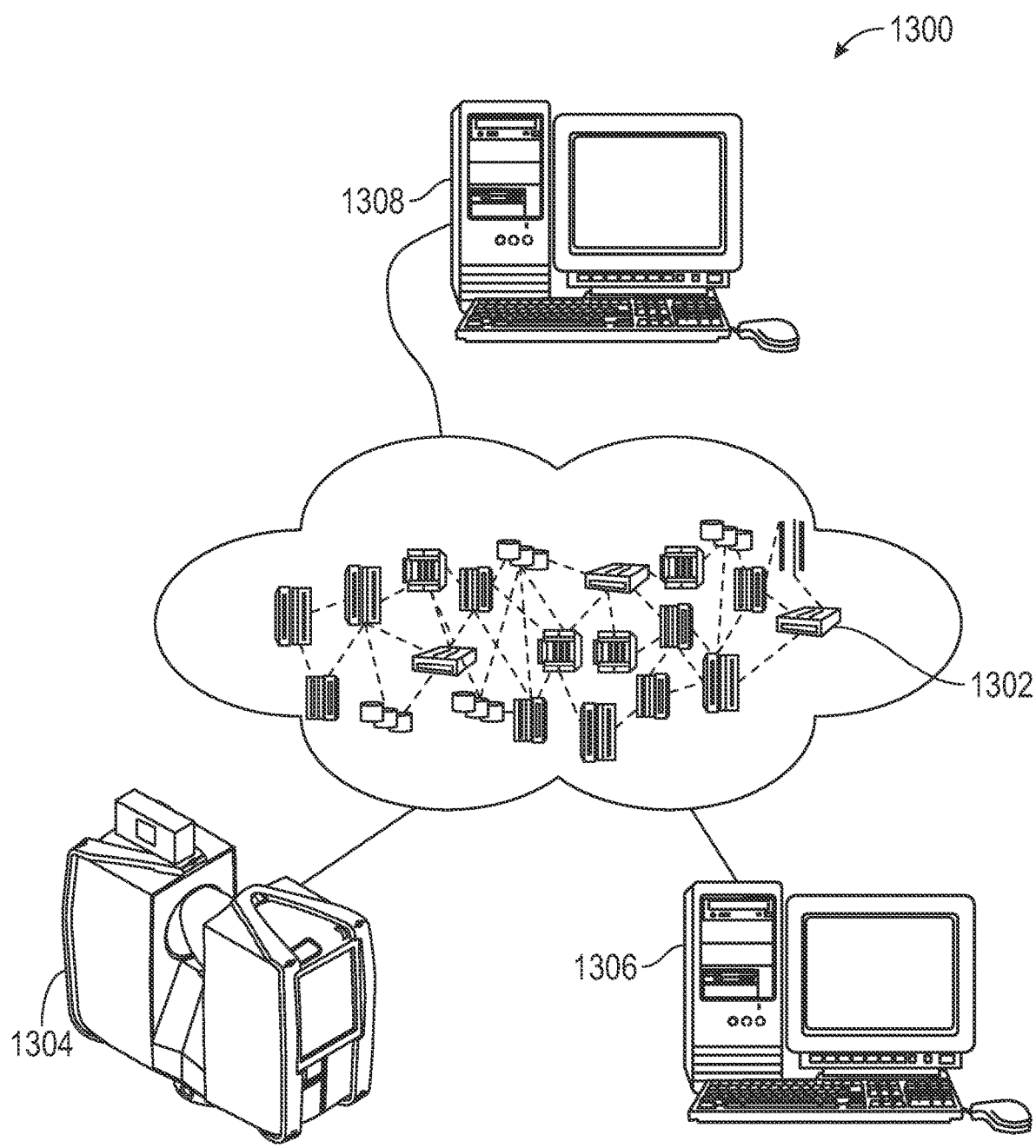
FIG. 13 is a schematic illustration of a cloud computing environment in accordance with one or more embodiments of the present invention.

Referring now to FIG. 13, an illustrative cloud computing environment 1300 is depicted. As shown, cloud computing environment 1300 comprises one or more cloud computing nodes 1302 with which local computing devices used by cloud consumers, such as, for example, coordinate measurement device 1304 and computers 1306 1308 may communicate. In an embodiment, the processing described herein is performed through the cooperation of computer 1308 or 1306, and the coordinate measurement device 1304. Nodes 1302 may communicate with one another. They may be grouped (not shown) physically or virtually, in one or more networks, such as Private, Community, Public, or Hybrid clouds as described hereinabove, or a combination thereof. This allows cloud computing environment 1300 to offer infrastructure, platforms and/or software as services for which a cloud consumer does not need to maintain resources on a local computing device. It is understood that the types of computing devices 1304-1308 shown in FIG. 13 are intended to be illustrative only and that computing nodes 1302 and cloud computing environment 1300 can communicate with any type of computerized device over any type of network and/or network addressable connection (e.g., using a web browser).

Figure 14:
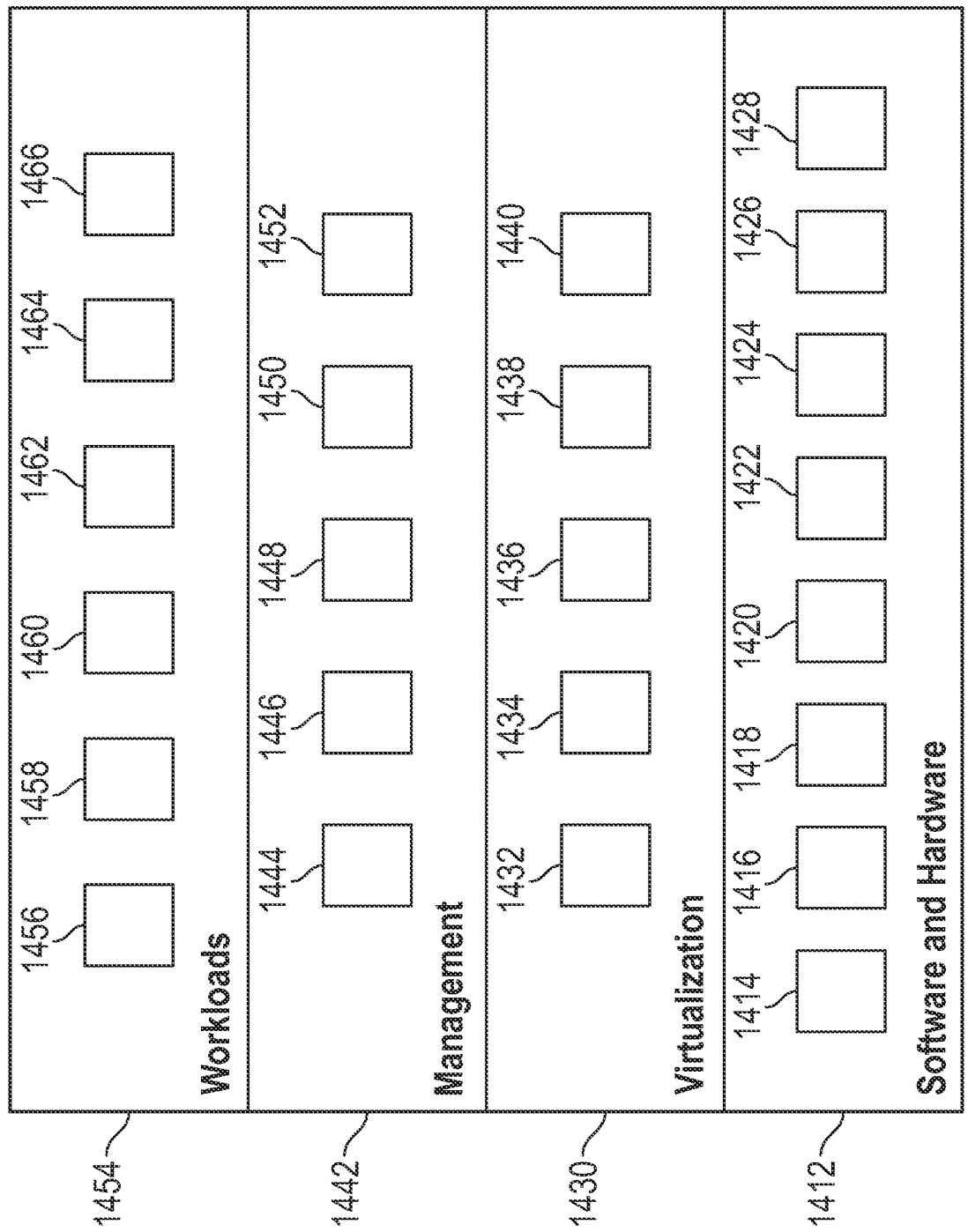
FIG. 14 is a schematic illustration of an abstraction model layers in accordance with one or more embodiments of the present invention.

Referring now to FIG. 14, a set of functional abstraction layers provided by cloud computing environment 1300 (FIG. 13) is shown. It should be understood in advance that the components, layers, and functions shown in FIG. 14 are intended to be illustrative only and embodiments of the invention are not limited thereto. As depicted, the following layers and corresponding functions are provided: hardware and software layer 1412 includes hardware and software components. Examples of hardware components include but are not limited to: mainframes 1414; desktop computer workstations; laptops; tablets; mobile telephones; RISC (Reduced Instruction Set Computer) architecture based servers 1416; servers 1418; blade servers 1420; storage devices 1422; and networks and networking components 1424. In some embodiments hardware components are imbedded or integrated into measurement or digital asset collections system. In some embodiments, software components include network application server software 1426, and database software 1428; virtualization layer 1430 provides an abstraction layer from which the following examples of virtual entities may be provided: virtual servers 1432; virtual storage 1434; virtual networks 1436, including virtual private networks; virtual applications and operating systems 1438; and virtual clients 1440.

In one example, management layer 1442 may provide the functions described below. Resource provisioning 1444 provides dynamic procurement of computing resources and other resources that are utilized to perform tasks within the cloud computing environment. Metering and pricing 1446 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1448 provides access to the cloud computing environment for consumers and system administrators. Service level management 1450 provides cloud computing resource allocation and management such that required service levels are met. Service Level Agreement (SLA) planning and fulfillment 1452 provides pre-arrangement for, and procurement of, cloud computing resources for which a future requirement is anticipated in accordance with an SLA.

Workloads layer 1454 provides examples of functionality for which the cloud computing environment may be utilized. Examples of workloads and functions which may be provided from this layer include: mapping and navigation 1456; software development and lifecycle management 1458; transaction processing 1460; scan processing software 1462; point cloud to virtual reality data processing 1464; and user defined content to point cloud processing 1466.

Figure 15:
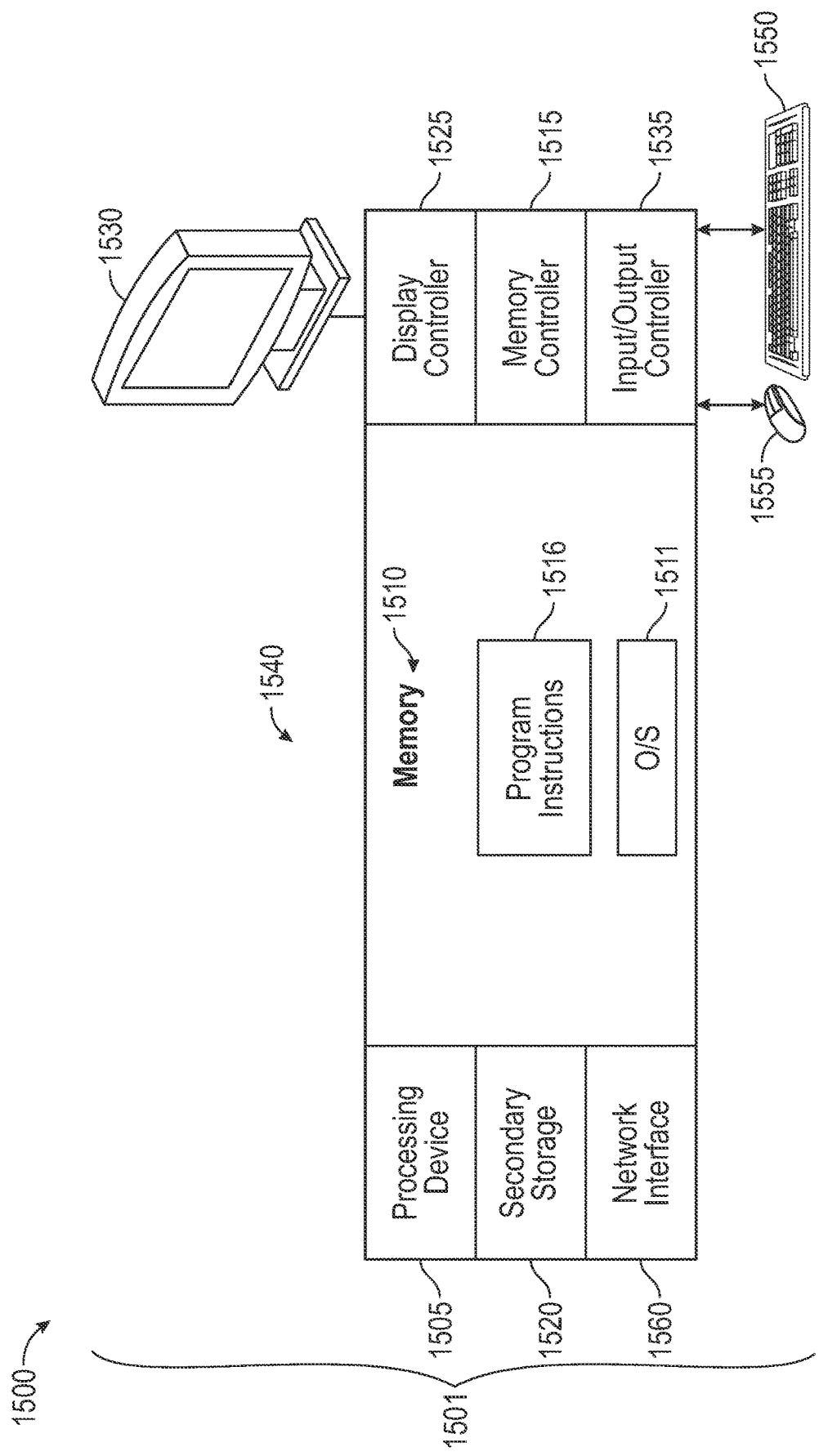
FIG. 15 is a schematic illustration of a computer system in accordance with one or more embodiments of the present invention.

Turning now to FIG. 15, a schematic illustration of a system 1500 is depicted upon which aspects of one or more embodiments of providing secure data in 3D software applications may be implemented. In an embodiment, all or a portion of the system 1500 may be incorporated into one or more of the 3D scanner device and processors described herein. In one or more exemplary embodiments, in terms of hardware architecture, as shown in FIG. 15, the computer 1501 includes a processing device 1505 and a memory 1510 coupled to a memory controller 1515 and an input/output controller 1535. The input/output controller 1535 can be, for example, but not limited to, one or more buses or other wired or wireless connections, as is known in the art. The input/output controller 1535 may have additional elements, which are omitted for simplicity, such as controllers, buffers (caches), drivers, repeaters, and receivers, to enable communications. Further, the computer 1501 may include address, control, and/or data connections to enable appropriate communications among the aforementioned components.

In one or more exemplary embodiments, a keyboard 1550 and mouse 1555 or similar devices can be coupled to the input/output controller 1535. Alternatively, input may be received via a touch-sensitive or motion sensitive interface (not depicted). The computer 1501 can further include a display controller 1525 coupled to a display 1530.

The processing device 1505 is a hardware device for executing software, particularly software stored in secondary storage 1520 or memory 1510. The processing device 1505 can be any custom made or commercially available computer processor, a central processing unit (CPU), an auxiliary processor among several processors associated with the computer 1501, a semiconductor-based microprocessor (in the form of a microchip or chip set), a macroprocessor, or generally any device for executing instructions.

The memory 1510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory 1510 may incorporate electronic, magnetic, optical, and/or other types of storage media. Accordingly, the memory 1510 is an example of a tangible computer readable storage medium 1540 upon which instructions executable by the processing device 1505 may be embodied as a computer program product. The memory 1510 can have a distributed architecture, where various components are situated remote from one another, but can be accessed by the processing device 1505.

The instructions in memory 1510 may include one or more separate programs, each of which comprises an ordered listing of executable instructions for implementing logical functions. In the example of FIG. 15, the instructions in the memory 1510 include a suitable operating system (OS) 1511 and program instructions 1516. The operating system 1511 essentially controls the execution of other computer programs and provides scheduling, input-output control, file and data management, memory management, and communication control and related services. When the computer 1501 is in operation, the processing device 1505 is configured to execute instructions stored within the memory 1510, to communicate data to and from the memory 1510, and to generally control operations of the computer 1501 pursuant to the instructions. Examples of program instructions 1516 can include instructions to implement the processing described herein in reference to FIGS. 1-14.

The computer 1501 of FIG. 15 also includes a network interface 1560 that can establish communication channels with one or more other computer systems via one or more network links. The network interface 1560 can support wired and/or wireless communication protocols known in the art. For example, when embodied in a user system, the network interface 1560 can establish communication channels with an application server.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, digital CPU devices, GPU devices, computing devices, microcontrollers, digital signal processors (DSPs), field programmable gate arrays (FPGAs), or like devices, as further described herein. A CPU typically performs a variety of tasks while a GPU is optimized to display or process images and/or 3D datasets.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

What is claimed is:

1. A computer-implemented method for encrypting scan data, the method comprising:
receiving the scan data, the scan data collected by a coordinate measurement device, wherein the scan data comprises a 3D data file that includes a point cloud representing an environment, wherein the scan data further comprises meta-data that describes the 3D data file, wherein the scan data is signed by a digital signature, and wherein the meta-data describes operations in a workflow and wherein the database stores an order of the operations in the workflow, the meta-data comprising for each of the operations:
a reference to an input data file for the operation;
a description of a transaction performed at the operation;
a reference to an output data file generated by the operation based at least in part on applying the transaction to the input data file;
a time stamp of a time of an update to the output data file; and
an identifier of at least one of a person and processor initiating the update;
storing the 3D data file and the meta-data associated with the 3D data file to a secure database, wherein the secure database is implemented by a blockchain, and wherein a new block is created for the scan data and added to an end of the blockchain; and
presenting the 3D data file and the meta-data, via a viewing software.

2. The computer-implemented method of claim 1, wherein the digital signature is implemented using asymmetric cryptography.

3. The computer-implemented method of claim 2, wherein the asymmetric cryptography comprises the coordinate measurement device being assigned a public key and a private key.

4. The computer-implemented method of claim 3, wherein a hash value of the scan data, including the 3D data file and the meta-data, is signed using the private key of the coordinate measurement device to generate the digital signature.

5. The computer-implemented method of claim 2, wherein the asymmetric cryptography comprises a user operating the coordinate measurement device being assigned a public key and a private key.

6. The computer-implemented method of claim 5, wherein a hash value of the scan data, including the 3D data file and the meta-data, is signed using the private key of the user operating the coordinate measurement device to generate the digital signature.

7. The computer-implemented method of claim 5, wherein the presenting comprises decrypting the 3D data file and the metadata with a corresponding private key that corresponds to the public key.

8. The computer-implemented method of claim 1, wherein the new block is encrypted using a public key.

9. The computer-implemented method of claim 1, wherein content of the scan data and content of the meta-data are validated as not being changed after being stored.

10. The computer-implemented method of claim 9, wherein the content of the scan data and the content of the meta-data are validated as not being changed after being stored by applying a public key to the digital signature and checking a hash value.

11. The computer-implemented method of claim 1, wherein the reference to the input data file for the operation comprises a description of the input data file for the operation.

12. The computer-implemented method of claim 1, wherein the reference to the output data file for the operation comprises a description of the output data file for the operation.

13. The computer-implemented method of claim 1, wherein an input data file for a first operation in the workflow is acquired by the coordinate measurement device.

14. The computer-implemented method of claim 13, wherein the coordinate measurement device comprises a photogrammetry device.

15. The computer-implemented method of claim 13, wherein the coordinate measurement device comprises a scanner.

16. The computer-implemented method of claim 1, wherein the 3D data file that includes the point cloud representing the environment is an encrypted 3D data file.

17. A system comprising:
a memory having computer readable instructions; and
at least one processor for executing the computer readable instructions, the computer readable instructions controlling the at least one processor to perform operations encrypting scan data, the operations comprising:
receiving the scan data, the scan data collected by a coordinate measurement device, wherein the scan data comprises a 3D data file that includes a point cloud representing an environment, wherein the scan data further comprises meta-data that describes the 3D data file, wherein the scan data is signed by a digital signature, and wherein the meta-data describes operations in a workflow and wherein the database stores an order of the operations in the workflow, the meta-data comprising for each of the operations:
a reference to an input data file for the operation;
a description of a transaction performed at the operation;
a reference to an output data file generated by the operation based at least in part on applying the transaction to the input data file;
a time stamp of a time of an update to the output data file; and
an identifier of at least one of a person and processor initiating the update;
storing the 3D data file and the meta-data associated with the 3D data file to a secure database, wherein the secure database is implemented by a blockchain, and wherein a new block is created for the scan data and added to an end of the blockchain; and
causing to present the 3D data file and the meta-data, via a viewing software.

18. The system of claim 17, wherein the asymmetric cryptography comprises the coordinate measurement device being assigned a public key and a private key and, wherein a hash value of the scan data, including the 3D data file and the meta-data, is signed using the private key of the coordinate measurement device to generate the digital signature.

19. The system of claim 17, wherein the digital signature is implemented using asymmetric cryptography, wherein the asymmetric cryptography comprises a user operating the coordinate measurement device being assigned a public key and a private key, wherein a hash value of the scan data, including the 3D data file and the meta-data, is signed using the private key of the user operating the coordinate measurement device to generate the digital signature, wherein causing to present the 3D data file comprises decrypting the 3D data file and the metadata with a corresponding private key that corresponds to the public key.

20. The system of claim 17, wherein the new block is encrypted using a public key.

21. The system of claim 17, wherein content of the scan data and content of the meta-data are validated as not being changed after being stored by applying a public key to the digital signature and checking a hash value.

22. The system of claim 17, wherein the reference to the input data file for the operation comprises a description of the input data file for the operation and a description of the output data file for the operation, and wherein an input data file for a first operation in the workflow is acquired by the coordinate measurement device.

* * * * *